US012425509B2

(12) United States Patent
Wang et al.

(10) Patent No.: US 12,425,509 B2
(45) Date of Patent: Sep. 23, 2025

(54) FULL-SCREEN DISPLAY METHOD FOR MOBILE TERMINAL AND DEVICE

(71) Applicant: HUAWEI TECHNOLOGIES CO., LTD., Guangdong (CN)

(72) Inventors: Bo Wang, Wuhan (CN); Ping Wen, Wuhan (CN); Guohui Han, Shenzhen (CN); Huawei Ju, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 600 days.

(21) Appl. No.: 17/622,106

(22) PCT Filed: Jun. 22, 2020

(86) PCT No.: PCT/CN2020/097528
§ 371 (c)(1),
(2) Date: Dec. 22, 2021

(87) PCT Pub. No.: WO2020/259452
PCT Pub. Date: Dec. 30, 2020

(65) Prior Publication Data
US 2022/0247857 A1 Aug. 4, 2022

(30) Foreign Application Priority Data
Jun. 25, 2019 (CN) .......................... 201910554567.6

(51) Int. Cl.
*H04M 1/72454* (2021.01)
*G06F 3/0481* (2022.01)
(Continued)

(52) U.S. Cl.
CPC ...... *H04M 1/72454* (2021.01); *G06F 3/0481* (2013.01); *G06F 3/04845* (2013.01);
(Continued)

(58) Field of Classification Search
CPC .......... H04M 1/72454; H04M 2201/42; G06F 3/0481; G06F 3/04845; G06F 3/0488; G06F 2203/04803
See application file for complete search history.

(56) References Cited

U.S. PATENT DOCUMENTS 10,963,139 B2 * 3/2021 Kang .................. G06F 3/04883
2015/0113455 A1 4/2015 Kang et al.
2024/0045564 A1 * 2/2024 Walkin .................. G06F 3/0482

FOREIGN PATENT DOCUMENTS

CN 104572058 A 4/2015
CN 105468437 A 4/2016
(Continued)

OTHER PUBLICATIONS

English Translation of CN 106201171 (Year: 2016).*
(Continued)

*Primary Examiner* — Patrick N Edouard
*Assistant Examiner* — Eboni N Giles

(57) ABSTRACT

The mobile terminal displays a first interface, where the first interface includes a first window and a second window, the first window and the second window are used to display a user interface of an application, and the first window includes a target object. The mobile terminal detects a first touch operation, where the first touch operation is used to indicate the mobile terminal to display the target object in full screen mode. The mobile terminal switches a portrait direction to a landscape direction in response to the first touch operation. The mobile terminal displays a second interface, where the second interface includes a third window, the third window is used to display the target object in full screen mode, and the third window is larger than the first window. The embodiments of this application are used for full-screen display.

23 Claims, 38 Drawing Sheets

(51) Int. Cl.
 *G06F 3/04845* (2022.01)
 *G06F 3/0488* (2022.01)
(52) U.S. Cl.
 CPC .. *G06F 3/0488* (2013.01); *G06F 2203/04803* (2013.01); *H04M 2201/42* (2013.01)

(56) References Cited

FOREIGN PATENT DOCUMENTS

| | | | |
|---|---|---|---|
| CN | 106168892 | A | 11/2016 |
| CN | 106502513 | A | 3/2017 |
| CN | 107203305 | A | 9/2017 |
| CN | 107690612 | A | 2/2018 |
| CN | 107728885 | A | 2/2018 |
| CN | 107818006 | A | 3/2018 |
| CN | 108089786 | A | 5/2018 |
| CN | 108415752 | A | 8/2018 |
| CN | 108595089 | A | 9/2018 |
| CN | 109151504 | A | 1/2019 |
| CN | 109445572 | A | 3/2019 |
| CN | 109885223 | A | 6/2019 |
| EP | 3336672 | A1 | 6/2018 |
| EP | 3493042 | A1 | 6/2019 |
| WO | 2019000437 | A1 | 1/2019 |

OTHER PUBLICATIONS

English Translation of CN 108415752 (Year: 2018).*
English Translation of CN 108595089 (Year: 2018).*
English Translation of CN 108803979 (Year: 2018).*

* cited by examiner

Romance of the Three Kingdoms

The empire, long divided, must unite; long united, must divide. Thus is has ever been. With this characterization of the inevitable cycle of Chinese history, the monumental tale Three Kingdoms begins. As important for Chinese culture as the Homeric epics have been for the West, this Ming Dynasty masterpiece continues to be read and loved throughout China as well as in Japan, Korea, and Vietnam.

The novel offers a startling and unsparing view of how power is wielded, how diplomatcy is conducted, and how wars are planned and fought; it has influenced the ways that Chinese think about power, diplomacy, and war even to this day.

0.2%    20:45    

FIG. 16B

FULL-SCREEN DISPLAY METHOD FOR MOBILE TERMINAL AND DEVICE

CROSS-REFERENCE TO RELATED APPLICATIONS

This application is a national stage of International Application No. PCT/CN2020/097528, filed on Jun. 22, 2020, which claims priority to Chinese Patent Application No. 201910554567.6, filed on Jun. 25, 2019. Both of the aforementioned applications are hereby incorporated by reference in their entireties.

TECHNICAL FIELD

Embodiments of this application relate to the field of electronic technologies, and in particular, to a full-screen display method for a mobile terminal and a device.

BACKGROUND

Currently, a multi-window display technology is widely used in a mobile terminal such as a mobile phone or a tablet computer. In a multi-window scenario, a plurality of windows may be displayed on the mobile terminal. When a video in a currently displayed window needs to be played in full screen mode, the mobile terminal may play the video in full screen mode in the window.

For example, in a multi-window scenario, as shown in FIG. 1A, a plurality of windows displayed on a tablet computer include a window 01 of a Weibo application and a window 02 of a setting application. After detecting an operation of tapping a full-screen play button 03 in the window 01 by a user, as shown in FIG. 1B, the tablet computer plays a video in full-screen mode in the window 01.

Use experience of the user is poor in a full-screen play manner used in the conventional technology.

SUMMARY

Embodiments of this application provide a full-screen display method for a mobile terminal and a device, so that a video play interface can be displayed in full screen mode on an entire screen of the mobile terminal, to improve immersive viewing experience of a user.

To achieve the foregoing objectives, the following technical solutions are used in the embodiments of this application.

According to one aspect, an embodiment of this application provides a full-screen display method for a mobile terminal. The mobile terminal includes a display; and the method includes: The mobile terminal displays a first interface, where the first interface includes a first window and a second window, the first window and the second window are used to display a user interface of an application, and the first window includes a target object. The mobile terminal detects a first touch operation, where the first touch operation is used to indicate the mobile terminal to display the target object in full screen mode. The mobile terminal switches a portrait direction to a landscape direction in response to the first touch operation. Then, the mobile terminal displays a second interface, where the second interface includes a third window, the third window is used to display the target object in full screen mode, and the third window is larger than the first window.

In this solution, after detecting an operation that is of a user and that indicates to perform full-screen display in the first window, the mobile terminal no longer displays the plurality of windows, but may display only one third window on an entire screen of the mobile terminal, where the third window is larger than the first window, and the third window is used to display the target object in full-screen mode. To be specific, the entire screen is used to display the target object in full screen mode in the third window, and the entire screen of the mobile terminal is used to display the target object in full screen mode. In this way, the mobile terminal may replace the first window with the larger third window, to display the target object in the larger range, and stop displaying the second window. Therefore, the user can see a larger target object, and does not see content in the second window, and is not visually interfered by the content in the second window, to improve browsing experience of the user.

In a possible design, a size of the third window is the same as a size of the display.

In this way, the target object in the third window may cover the entire screen of the mobile terminal, and a size of the target object matches a size of the entire screen, which is different from the conventional technology in which the target object can be displayed in full screen mode only in a window in a partial area of the screen. Therefore, better immersive browsing experience can be provided for the user.

In another possible design, before the mobile terminal switches the portrait direction to the landscape direction, the method further includes: The mobile terminal obtains a display direction, where the display direction includes the landscape direction or the portrait direction. That the mobile terminal switches a portrait direction to a landscape direction includes: If the display direction obtained by the mobile terminal is the portrait direction, and a difference between a width and a height of the display is greater than a preset value, the mobile terminal switches the display direction from the portrait direction to the landscape direction.

To be specific, if the width and the height of the display differ greatly, and the display direction obtained by the mobile terminal is the portrait direction, the mobile terminal switches to the landscape direction, to better display the target object in full screen mode in the landscape direction.

In another possible design, if the display direction obtained by the mobile terminal is the portrait direction, and the difference between the width and the height of the display is less than or equal to the preset value, the mobile terminal performs full-screen display.

In this solution, if the width and the height of the display differ slightly, full-screen display effects of the landscape direction and the portrait direction differ slightly. Therefore, the mobile terminal may not switch the portrait direction to the landscape direction.

In another possible design, after the mobile terminal obtains the display direction, the method further includes: If the display direction obtained by the mobile terminal is the landscape direction, the mobile terminal displays the second interface.

To be specific, if the display direction obtained by the mobile terminal is the landscape direction, the mobile terminal does not need to switch the display direction, but may directly perform full-screen display.

In another possible design, after the mobile terminal switches the portrait direction to the landscape direction, the method further includes: The mobile terminal stores direction switching information, where the direction switching information is used to indicate that the display direction is switched from the portrait direction to the landscape direction. After the mobile terminal displays the second interface, the method further includes: The mobile terminal detects an instruction for exiting full-screen display. The mobile terminal switches the display direction back to the portrait direction based on the direction switching information. The mobile terminal displays a third interface, where the third interface includes the first window and the second window, and sizes of the first window and the second window in the third interface are the same as sizes of the first window and the second window in the first interface.

To be specific, after exiting full-screen display, the mobile terminal may restore a multi-window display status existing before full-screen display.

In another possible design, the mobile terminal includes an activity manager and a window manager. That the mobile terminal displays a second interface, where the second interface includes a third window, the third window is used to display the target object in full screen mode, and the third window is larger than the first window includes: The activity manager updates first status information of the first window, where the first status information includes a window size of the first window, and an updated window size of the first window is greater than a size of the first window in the first interface. The activity manager updates updated first status information to a configuration file of an application corresponding to the first window. The window manager draws the third window based on the updated first status information in the configuration file. The display displays the third window, where the third window is used to display the target object in full screen mode.

In this way, the mobile terminal may update information about the first window by using the configuration file, so that the updated size of the first window is greater than the size of the first window displayed in the first interface. Further, the mobile terminal draws the third window based on the updated information about the first window, so that the third window is larger than the first window displayed in the first interface.

In another possible design, the first interface displays the first window and the second window in split-screen mode. Before the window manager draws the third window, the method further includes: The activity manager switches a split-screen mode to a full-screen mode. That the window manager draws the third window based on the updated first status information in the configuration file includes: The window manager draws the third window based on the updated first status information in the configuration file and the full-screen mode.

To be specific, if the mobile terminal displays the first window in split-screen mode in the first interface, the mobile terminal can perform full-screen display only after switching the split-screen mode to the full-screen mode.

In another possible design, a window mode corresponding to the first window in the first interface is the split-screen mode, the first status information further includes a window mode, and an updated window mode corresponding to the first window is the full-screen mode.

To be specific, if the first window is in split-screen mode, the mobile terminal can perform full-screen display only after switching the split-screen mode to the full-screen mode.

In another possible design, the mobile terminal includes an activity manager and a window manager. After the mobile terminal detects the first touch operation, the method further includes: The activity manager stores second status information of the first window and second status information of the second window, where the second status information includes a window size and a window mode. That the mobile terminal displays a third interface, where the third interface includes the first window and the second window, and sizes of the first window and the second window in the third interface are the same as sizes of the first window and the second window in the first interface includes: The activity manager updates the stored second status information of the first window to a configuration file of an application corresponding to the first window. The window manager draws the first window in the third interface based on the second status information of the first window in the configuration file. The display displays the first window in the third interface, where a size of the first window in the third interface is the same as a size of the first window in the first interface. The activity manager updates the stored second status information of the second window to a configuration file of an application corresponding to the second window. The window manager draws the second window in the third interface based on the second status information of the second window in the configuration file. The display displays the second window in the third interface, where a size of the second window in the third interface is the same as a size of the second window in the first interface.

To be specific, the mobile terminal may store multi-window status information existing before full-screen display, so that after exiting full-screen display, the mobile terminal may restore, based on the stored information, a multi-window display status existing before full-screen display.

In another possible design, the target object includes a video, a picture, a game interface, or a reader interface.

To be specific, the mobile terminal may play the video in full screen mode, display the picture in full screen mode, display the game running interface in full screen mode, display the reader interface in full screen mode, or the like on the entire display.

In another possible design, the target object is the video. Before the mobile terminal displays the second interface, the method further includes: The mobile terminal determines that one or more of the following are met: an audio and video decoder is in a working state; an application corresponding to the first window in which the video is located obtains an audio focus; or the first window includes a subwindow of a SurfaceView type.

In this solution, the mobile terminal may more accurately determine, based on these conditions, that the video needs to be played in full screen mode.

In another possible design, the first window in the first interface includes a first control, and the first touch operation is a touch operation performed on the first control.

In this way, when detecting the touch operation (for example, a tap operation) performed by the user on the first control, the mobile terminal may implement device-level full-screen display on the entire display.

In another possible design, the first window in the first interface further includes a second control; and the method further includes: The mobile terminal detects a touch operation performed on the second control. The mobile terminal displays the target object in full screen mode in the first window in response to the touch operation performed on the second control.

In this way, when detecting the touch operation (for example, a tap operation) performed by the user on the second control, the mobile terminal may perform full-screen display in the first window. Therefore, for touch operations performed by the user on different controls, the mobile terminal may have different full-screen display modes, including a device-level full-screen display mode and an intra-window full-screen display mode.

In another possible design, mutual switching may be performed between a device-level full-screen display mode and an intra-window full-screen display mode.

In another possible design, after the mobile terminal displays the target object in full screen mode in the first window, the method further includes: The mobile terminal detects a third touch operation. The mobile terminal displays the second interface in response to the third touch operation.

To be specific, the device-level full-screen display mode may be switched to the intra-window full-screen display mode.

In another possible design, after the mobile terminal displays the second interface, the method further includes: The mobile terminal detects a fourth touch operation, where the fourth touch operation is used to indicate to switch a full-screen display mode. The mobile terminal displays a fourth interface in response to the fourth touch operation, where the fourth interface includes the first window and the second window, and sizes of the first window and the second window in the fourth interface are the same as the sizes of the first window and the second window in the first interface. The mobile terminal displays the target object in full screen mode in the first window.

To be specific, the intra-window full-screen display mode may be switched to the device-level full-screen display mode.

According to another aspect, an embodiment of this application provides another full-screen display method for a mobile terminal. The mobile terminal includes a display; and the method includes:

The mobile terminal displays a first interface, where the first interface includes a first window, the first window is smaller than the display, the first window is used to display a user interface of an application, and the first window includes a target object. The mobile terminal detects a first touch operation, where the first touch operation is used to indicate the mobile terminal to display the target object in full screen mode. The mobile terminal switches a portrait direction to a landscape direction in response to the first touch operation. The mobile terminal displays a second interface, where the second interface includes a second window, the second window is used to display the target object in full screen mode, and the second window is larger than the first window.

In this solution, after detecting an operation that is of a user and that indicates to perform full-screen display in the first window, the mobile terminal no longer displays the plurality of windows, but may display one second window on an entire screen of the mobile terminal, where the second window is larger than the first window, and the second window is used to display the target object in full-screen mode. To be specific, the entire screen is used to display the target object in full screen mode in the second window, and the entire screen of the mobile terminal is used to display the target object in full screen mode. In this way, the mobile terminal may replace the first window with the larger second window, to display the target object in the larger range. Therefore, the user can see a larger target object, to improve browsing experience of the user.

In a possible design, after the mobile terminal switches the portrait direction to the landscape direction, the method further includes: The mobile terminal stores direction switching information. After the mobile terminal displays the second interface, the method further includes:

The mobile terminal detects an instruction for exiting full-screen display. If the mobile terminal determines, based on the direction switching information, that the display direction is switched from the portrait direction to the landscape direction, the mobile terminal switches the display direction back to the portrait direction. The mobile terminal displays a third interface, where the third interface includes the first window, and a size of the first window in the third interface is the same as a size of the first window in the first interface.

After exiting full-screen display, the mobile terminal may restore a multi-window display status existing before full-screen display.

In another possible design, before the mobile terminal detects the first touch operation, the method further includes: The mobile terminal detects a second touch operation, where the second touch operation is used to indicate the mobile terminal to display the target object in full screen mode. The mobile terminal displays the target object in full screen mode in the first window in response to the second touch operation.

In this way, for different touch operations of the user, the mobile terminal may have different full-screen display modes, including a device-level full-screen display mode and an intra-window full-screen display mode.

According to another aspect, an embodiment of this application provides a mobile terminal, including one or more processors, a memory, and a touchscreen, configured to: detect a touch operation and display an interface. The memory stores code, and when the code is executed by the one or more processors, the mobile terminal is enabled to perform the following steps: displaying a first interface, where the first interface includes a first window and a second window, the first window and the second window are used to display a user interface of an application, and the first window includes a target object; detecting a first touch operation, where the first touch operation is used to indicate to display the target object in full screen mode; switching a portrait direction to a landscape direction in response to the first touch operation; and displaying a second interface, where the second interface includes a third window, the third window is used to display the target object in full screen mode, and the third window is larger than the first window.

In this solution, after detecting an operation that is of a user and that indicates to perform full-screen display in the first window, the mobile terminal no longer displays the plurality of windows, but may display only one third window on an entire screen of the mobile terminal, where the third window is larger than the first window, and the third window is used to display the target object in full-screen mode. To be specific, the entire screen is used to display the target object in full screen mode in the third window, and the entire screen of the mobile terminal is used to display the target object in full screen mode. In this way, the mobile terminal may replace the first window with the larger third window, to display the target object in the larger range, and stop displaying the second window. Therefore, the user can see a larger target object, and does not see content in the second window, and is not visually interfered by the content in the second window, to improve browsing experience of the user.

In a possible design, when the code is executed by the one or more processors, the mobile terminal is further enabled to perform the following step: obtaining a display direction before switching the portrait direction to the landscape direction, where the display direction includes the landscape direction or the portrait direction. The mobile terminal is configured to: if the obtained display direction is the portrait direction, and a difference between a width and a height of the touchscreen is greater than a preset value, switch the display direction from the portrait direction to the landscape direction.

In another possible design, when the code is executed by the one or more processors, the mobile terminal is further enabled to perform the following step: after obtaining the display direction, if the obtained display direction is the landscape direction, displaying the second interface; or if the obtained display direction is the portrait direction, and the difference between the width and the height of the touchscreen is less than or equal to the preset value, displaying the second interface.

In another possible design, when the code is executed by the one or more processors, the mobile terminal is further enabled to perform the following steps: storing direction switching information after switching the portrait direction to the landscape direction, where the direction switching information is used to indicate that the display direction is switched from the portrait direction to the landscape direction; after displaying the second interface, detecting an instruction for exiting full-screen display; switching the display direction back to the portrait direction based on the direction switching information; and displaying a third interface, where the third interface includes the first window and the second window, and sizes of the first window and the second window in the third interface are the same as sizes of the first window and the second window in the first interface.

In another possible design, the code is used to implement an activity manager and a window manager. The activity manager updates first status information of the first window, where the first status information includes a window size of the first window, and an updated window size of the first window is greater than a size of the first window in the first interface. The activity manager updates updated first status information to a configuration file of an application corresponding to the first window. The window manager draws the third window based on the updated first status information in the configuration file. The touchscreen displays the third window, where the third window is used to display the target object in full screen mode.

In another possible design, the first interface displays the first window and the second window in split-screen mode. The activity manager switches a split-screen mode to a full-screen mode. The window manager draws the third window based on the updated first status information in the configuration file and the full-screen mode.

In another possible design, the code is used to implement an activity manager and a window manager. After the first touch operation is detected, the activity manager stores second status information of the first window and second status information of the second window, where the second status information includes a window size and a window mode. The activity manager updates the stored second status information of the first window to a configuration file of an application corresponding to the first window. The window manager draws the first window in the third interface based on the second status information of the first window in the configuration file. The touchscreen displays the first window in the third interface, where a size of the first window in the third interface is the same as a size of the first window in the first interface. The activity manager updates the stored second status information of the second window to a configuration file of an application corresponding to the second window. The window manager draws the second window in the third interface based on the second status information of the second window in the configuration file. The touchscreen displays the second window in the third interface, where a size of the second window in the third interface is the same as a size of the second window in the first interface.

In another possible design, the target object includes a video, a picture, a game interface, or a reader interface.

In another possible design, the target object is the video. When the code is executed by the one or more processors, the mobile terminal is further enabled to perform the following step: before displaying the second interface, determining that one or more of the following are met:
an audio and video decoder is in a working state; an application corresponding to the first window in which the video is located obtains an audio focus; or the first window includes a subwindow of a SurfaceView type.

In another possible design, the first window in the first interface includes a first control, and the first touch operation is a touch operation performed on the first control.

In another possible design, the first window in the first interface further includes a second control. When the code is executed by the one or more processors, the mobile terminal is further enabled to perform the following steps: detecting a touch operation performed on the second control; and displaying the target object in full screen mode in the first window in response to the touch operation performed on the second control.

According to another aspect, an embodiment of this application provides a full-screen display apparatus. The apparatus is included in a mobile terminal, and the apparatus has functions of implementing behavior of the mobile terminal in any method in the foregoing aspects and the possible designs. The functions may be implemented by hardware, or may be implemented by hardware executing corresponding software. The hardware or the software includes at least one module or unit corresponding to the functions, for example, a display module or unit, a detection module or unit, a switching module or unit, or an obtaining module or unit.

According to another aspect, an embodiment of this application provides a computer storage medium, including computer instructions. When the computer instructions are run on a mobile terminal, the mobile terminal is enabled to perform the full-screen display method in any possible design of the foregoing aspects.

According to another aspect, an embodiment of this application provides a computer program product. When the computer program product runs on a computer, the computer is enabled to perform the full-screen display method in any possible design of the foregoing aspects.

BRIEF DESCRIPTION OF DRAWINGS

FIG. 16B is a diagram of another full-screen display interface according to an embodiment of this application;

DESCRIPTION OF EMBODIMENTS

Figure 1A:
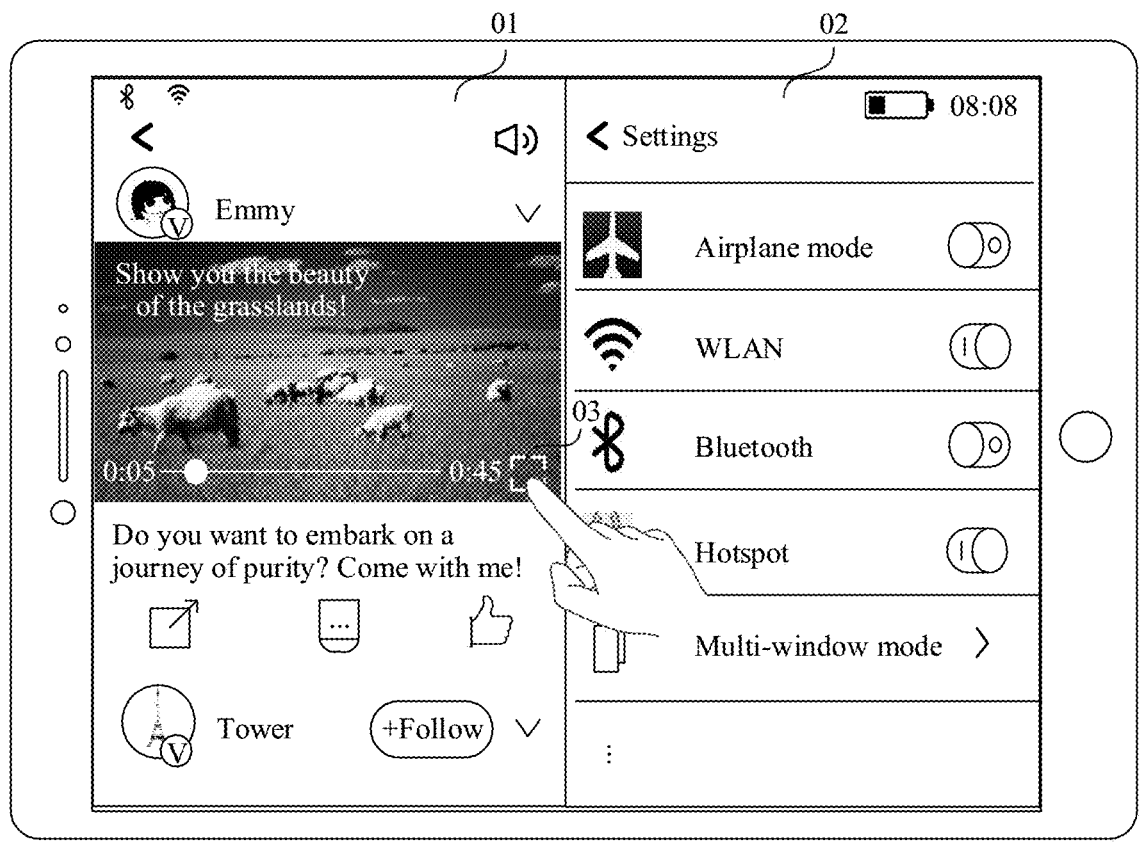
FIG. 1A is a diagram of a multi-window display interface according to the conventional technology.

The following describes the technical solutions in the embodiments of this application with reference to the accompanying drawings in the embodiments of this application. In the descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more.

In the conventional technology, in a multi-window scenario, when a mobile terminal detects an operation that is of a user indicates to play a video in a window in full-screen mode, the mobile terminal still displays a plurality of windows, and displays a video play interface in full-screen mode in a window in which the video is located, to implement full-screen video play. For example, after detecting that the user indicates to play, in full screen mode, a video in a window 01 of a Weibo application shown in FIG. 1A, as shown in FIG. 1B, the mobile terminal still displays the window 01 of the Weibo application and a window 02 of a setting application, and displays a video play interface in full screen mode in the window 01 of the Weibo application. That a video play interface is displayed in full screen mode in the window 01 of the Weibo application means that a size of a video picture matches a size of the window 01 of the Weibo application. As shown in FIG. 1B, a video picture in a video play window occupies the window 01 of the Weibo application horizontally, and a blank edge (that is, a black edge shown in FIG. 1B) is left between the video picture and each of an upper edge line and a lower edge line of the window 01 of the Weibo application vertically. The entire window 01 of the Weibo application is used to display the video play interface, and the video play interface occupies the window 01 of the Weibo application.

In a full-screen play manner used in the conventional technology, the video play interface can be displayed in full screen mode only in the window of the Weibo application, that is, the video play interface can be displayed in full screen mode only in a partial area of the mobile terminal. A size of the video picture matches a size of the application window. Therefore, this may be referred to as intra-window full-screen display. However, the video play interface cannot be displayed in full screen mode on the entire screen of the mobile terminal, resulting in poor immersive experience of the user.

An embodiment of this application provides a full-screen display method. The method may be applied to a mobile terminal having a screen. In a multi-window scenario, the mobile terminal may display a plurality of windows on the screen, and a size of each window is less than a size of the screen. For example, the plurality of windows include a first window and a second window. After detecting an operation that is of a user and that indicates to perform full-screen display in the first window, the mobile terminal no longer displays the plurality of windows, but may display only one third window on an entire screen of the mobile terminal, where the third window is larger than the first window, and the third window is used to display the target object in full-screen mode. To be specific, the entire screen is used to display the target object in full screen mode in the third window, and the entire screen of the mobile terminal is used to display the target object in full screen mode. Therefore, this may be referred to as device-level full-screen display. In this way, the mobile terminal may replace the first window with the larger third window, to display the target object in the larger range, and stop displaying the second window. Therefore, the user can see a larger target object, and does not see content in the second window, and is not visually interfered by the content in the second window, to improve browsing experience of the user.

In some embodiments, a size of the third window is the same as or basically the same as a size of the screen. In this way, the target object in the third window may cover the entire screen of the mobile terminal, and a size of the target object matches a size of the entire screen, which is different from the conventional technology in which the target object can be displayed in full screen mode only in a window in a partial area of the screen. Therefore, better immersive browsing experience can be provided for the user.

For example, the target object may be a video. In a multi-window scenario, after detecting an operation that is of the user and that indicates to play the video in full screen mode (or indicates to display a video play interface in full screen mode), the mobile terminal no longer displays a plurality of windows, but may display the video play interface in full screen mode on the entire screen of the mobile terminal. A video play window covers the entire screen, the entire screen is used to display the video play interface, and a size of a video picture matches a size of the screen, which is different from the conventional technology in which the video play interface can be displayed in full screen mode only in a window in a partial area of the screen. Therefore, better immersive video viewing experience can be provided for the user. For another example, the target object displayed in full screen mode on the entire screen of the mobile terminal may alternatively be a picture, a game interface, or a reader interface. The mobile terminal may be an electronic device such as a tablet computer, a mobile phone, a foldable device, a netbook, a personal digital assistant (personal digital assistant, PDA), a wearable device, or an augmented reality (augmented reality, AR)/virtual reality (virtual reality, VR) device. A specific type of the mobile terminal is not limited in this embodiment of this application.

Figure 2:
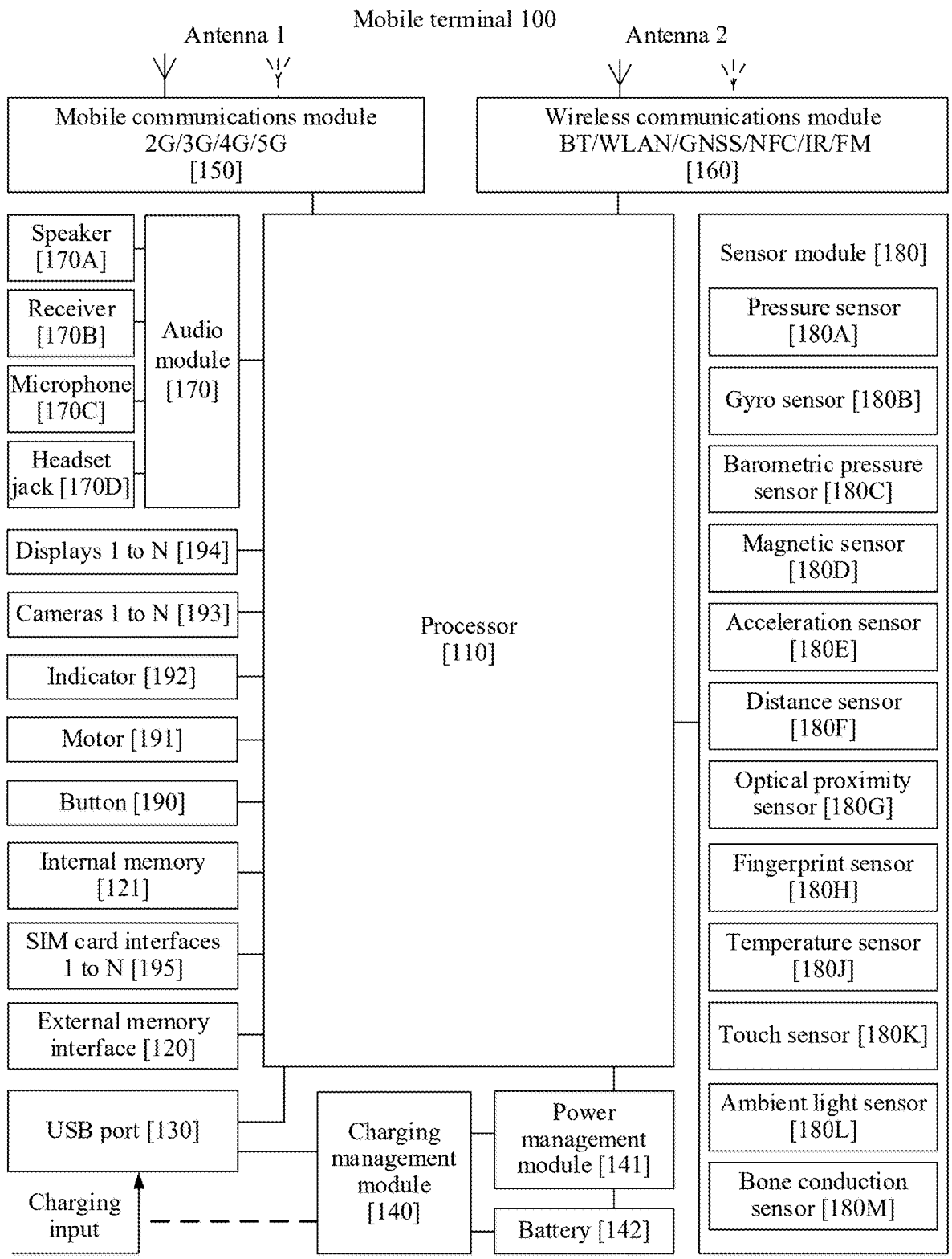
FIG. 2 is a schematic diagram of a structure of a mobile terminal according to an embodiment of this application.

For example, FIG. 2 is a schematic diagram of a structure of a mobile terminal 100. The mobile terminal 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile terminal 100. In some other embodiments of this application, the mobile terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the mobile terminal 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that is just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may be configured to: execute the instructions in the memory, and invoke a related module to implement functions of the mobile terminal 100 in this embodiment of this application. For example, in a multi-window scenario, a function of performing full-screen display on the entire display of the mobile terminal is implemented.

In some embodiments, in a multi-window scenario, when the mobile terminal determines to perform full-screen display on the entire display, the internal memory 121 or the memory in the processor 110 may store current multi-window status information, so that after exiting full-screen video play, the mobile terminal may restore a multi-window display status based on the status information.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C interfaces. For example, the processor 110 may be coupled to the touch sensor 180K through the I2C interface, so that the processor 110 communicates with the touch sensor 180K through the I2C bus interface, to implement a touch function of the mobile terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI to implement a photographing function of the mobile terminal 100. The processor 110 communicates with the display 194 through the DSI, to implement a display function of the mobile terminal 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to the charger to charge the mobile terminal 100, may be configured to transmit data between the mobile terminal 100 and a peripheral device, or may be configured to connect to a headset to play audio by using the headset. The port may alternatively be configured to connect to another mobile terminal, for example, an AR device.

It may be understood that an interface connection relationship between the modules shown in this embodiment of this application is merely an example for description, and does not constitute a limitation on the structure of the mobile terminal 100. In some other embodiments of this application, the mobile terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the mobile terminal 100. When charging the battery 142, the charging management module 140 may further supply power to the mobile terminal by using the power management module 141.

The power management module 141 is configured to connect to the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile terminal 100 may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the mobile terminal 100 may be configured to cover one or more communication bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that is applied to the mobile terminal 100 and that includes 2G/3G/4G/5G or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communications module 150 or another functional module.

The wireless communications module 160 may provide a wireless communication solution that is applied to the mobile terminal 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more devices that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

In some embodiments, the antenna 1 and the mobile communications module 150 in the mobile terminal 100 are coupled, and the antenna 2 and the wireless communications module 160 in the mobile terminal 100 are coupled, so that the mobile terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile terminal 100 implements a display function by using the GPU, the display 194, the application processor, and the like. The GPU is a microprocessor for image processing, and is connected to the display 194 and the application processor. The GPU is configured to: perform mathematical and geometric calculation, and render an image. In some embodiments, the GPU may draw a window. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes, QLED), or the like. In some embodiments, the mobile terminal 100 may include one or N displays 194, where N is a positive integer greater than 1.

In some embodiments, in a multi-window scenario, a plurality of windows may be displayed on the display 194. After the mobile terminal 100 detects an operation that is of the user and that indicates to perform full-screen display in a window, the display 194 may display a target object in full screen mode in an entire display area.

The mobile terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the mobile terminal 100 may include one or N cameras 193, where N is a positive integer greater than 1.

The digital signal processor is configured to process a digital signal, and may process another digital signal in addition to the digital image signal. For example, when the mobile terminal 100 selects a frequency, the digital signal processor is configured to perform Fourier transform on energy of the frequency.

The video codec is configured to: compress or decompress a digital video. The mobile terminal 100 may support one or more video codecs. In this way, the mobile terminal 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU may be used to implement an application such as intelligent cognition of the mobile terminal 100, for example, image recognition, facial recognition, speech recognition, and text understanding.

The external memory interface 120 may be configured to connect to an external memory card such as a micro SD card, to extend a storage capability of the mobile terminal 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instruction stored in the internal memory 121, to implement various function applications of the mobile terminal 100 and process data. The internal memory 121 may include a program storage area and a data storage area. The program storage area may store an operating system, an application required by at least one function (for example, a voice playing function or an image playing function), and the like. The data storage area may store data (for example, audio data or an address book) created in a process of using the mobile terminal 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The mobile terminal 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile terminal 100 may be used to listen to music or listen to a hands-free call by using the speaker 170A.

The receiver 170B, also referred to as an "earpiece", is configured to convert an audio electrical signal into a sound signal. When the mobile terminal 100 is used to answer a call or listen to voice information, a voice may be listened to by placing the receiver 170B close to a human ear.

The microphone 170C, also referred to as a "mike" or a "mic", is configured to convert a sound signal into an electrical signal. When making a call or sending voice information, the user may make a sound by moving a human mouth close to the microphone 170C to input a sound signal to the microphone 170C. At least one microphone 170C may be disposed in the mobile terminal 100. In some other embodiments, two microphones 170C may be disposed in the mobile terminal 100, to collect a sound signal and further implement a noise reduction function. In some other embodiments, three, four, or more microphones 170C may be disposed in the mobile terminal 100, to collect a sound signal, reduce noise, identify a sound source, implement a directional recording function, and the like.

In some embodiments, the microphone 170C may be configured to receive a voice signal that is of the user and that indicates to perform full-screen display.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile terminal 100 determines pressure strength based on a capacitance change. When a touch operation is performed on the display 194, the mobile terminal 100 detects intensity of the touch operation based on the pressure sensor 180A. The mobile terminal 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating an SMS message is executed.

The gyro sensor 180B may be configured to determine a motion posture of the mobile terminal 100. In some embodiments, angular velocities of the mobile terminal 100 around three axes (that is, x, y, and z axes) may be determined by using the gyro sensor 180B. The gyro sensor 180B may be configured to perform image stabilization during photographing. For example, when the shutter is pressed, the gyro sensor 180B detects an angle at which the mobile terminal 100 jitters, calculates, based on the angle, a distance for which a lens module needs to compensate, and allows the lens to cancel the jitter of the mobile terminal 100 through reverse motion, to implement image stabilization. The gyro sensor 180B may be further used in a navigation scenario and a motion-sensing game scenario.

The barometric pressure sensor 180C is configured to measure barometric pressure. In some embodiments, the mobile terminal 100 calculates an altitude by using a value of the barometric pressure measured by the barometric pressure sensor 180C, to assist in positioning and navigation.

The magnetic sensor 180D includes a Hall effect sensor. The mobile terminal 100 may detect opening and closing of a flip leather case by using the magnetic sensor 180D. In some embodiments, when the mobile terminal 100 is a clamshell phone, the mobile terminal 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect values of accelerations in various directions (usually on three axes) of the mobile terminal 100. When the mobile terminal 100 is still, a value and a direction of gravity can be detected. The acceleration sensor 180E may be further configured to identify a posture of the mobile terminal, and is applied to an application such as screen switching between a landscape mode and a portrait mode and a pedometer.

The distance sensor 180F is configured to measure a distance. The mobile terminal 100 may measure a distance by using an infrared ray or a laser. In some embodiments, in a photographing scenario, the mobile terminal 100 may use the distance sensor 180F to measure a distance, to implement fast focusing.

The optical proximity sensor 180G may include, for example, a light-emitting diode (LED) and an optical detector such as a photodiode. The light-emitting diode may be an infrared light-emitting diode. The mobile terminal 100 emits infrared light to the outside by using the light-emitting diode. The mobile terminal 100 uses the photodiode to detect infrared reflected light from a nearby object. When sufficient reflected light is detected, the mobile terminal 100 may determine that there is an object near the mobile terminal 100. When insufficient reflected light is detected, the mobile terminal 100 may determine that there is no object near the mobile terminal 100. The mobile terminal 100 may detect, by using the optical proximity sensor 180G, that the user holds the mobile terminal 100 close to an ear to make a call, to automatically turn off the screen for power saving. The optical proximity sensor 180G may also be used in a leather case mode or a pocket mode to automatically unlock or lock the screen.

The ambient light sensor 180L is configured to sense ambient light brightness. The mobile terminal 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the mobile terminal 100 is in a pocket to prevent an accidental touch.

The fingerprint sensor 180H is configured to collect a fingerprint. The mobile terminal 100 may use a feature of the collected fingerprint to implement fingerprint unlocking, application lock access, fingerprint-based photographing, fingerprint-based call answering, and the like.

The temperature sensor 180J is configured to detect a temperature. In some embodiments, the mobile terminal 100 executes a temperature processing policy by using the temperature detected by the temperature sensor 180J. For example, when the temperature reported by the temperature sensor 180J exceeds a threshold, the mobile terminal 100 lowers performance of a processor located near the temperature sensor 180J, to reduce power consumption to implement thermal protection. In some other embodiments, when the temperature is less than another threshold, the mobile terminal 100 heats the battery 142 to prevent abnormal shutdown of the mobile terminal 100 that is caused by the low temperature. In some other embodiments, when the temperature is less than still another threshold, the mobile terminal 100 boosts an output voltage of the battery 142 to prevent abnormal shutdown caused by the low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor 180K. The touch sensor may transfer the detected touch operation to the application processor to determine a type of a touch event. Visual output related to the touch operation may be provided on the display 194. In some other embodiments, the touch sensor 180K may alternatively be disposed on a surface of the mobile terminal 100 at a location different from that of the display 194.

In some embodiments, the touch sensor 180K may be configured to detect a touch operation performed by the user on a full-screen display control on the display 194, so that the mobile terminal implements device-level full-screen display on the entire display in response to the touch operation.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The mobile terminal 100 may receive a key input, and generate a key signal input related to a user setting and function control of the mobile terminal 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile terminal 100. The mobile terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may be compatible with different types of SIM cards. The SIM card interface 195 may also be compatible with an external memory card. The mobile terminal 100 interacts with a network by using the SIM card, to implement functions such as a call and data communication. In some embodiments, the mobile terminal 100 uses an eSIM, that is, an embedded SIM card. The eSIM card may be embedded into the mobile terminal 100, and cannot be separated from the mobile terminal 100.

A scenario in which a video is played in full screen mode is used as an example to describe a hardware working procedure of the mobile terminal in this embodiment of this application. The touch sensor 180K may detect an operation that the user touches a full-screen play control. In response to this operation, the processor 110 may draw a window whose size is the same as a size of the display 194. The display 194 displays a video play picture in full screen mode in the window, to implement device-level full-screen video play.

With reference to a mobile terminal having structures shown in FIG. 2 and FIG. 17A, a full-screen display method provided in an embodiment of this application is described below by using an example in which a video is played in full screen mode in a multi-window scenario.

The mobile terminal includes a screen. The screen may be the display 194, or may be a touchscreen including the display 194 and the touch sensor 180K. The screen usually includes a plurality of windows, and a window includes a video.

The video may be a video in a video player, or a video in another application such as Weibo, WeChat, or Gallery. The video may be a video shot by the mobile terminal, a video downloaded by the mobile terminal, or a video obtained in another manner. This is not limited in this embodiment of this application.

The multi-window scenario may specifically include a plurality of application scenarios, for example, a free multi-application multi-window scenario, a single-application multi-window scenario, a split-screen (for example, a native split-screen solution of the Google (Google) system) multi-application multi-window scenario, and a picture-in-picture scenario.

For example, in the free multi-application multi-window scenario, one or more application windows may be displayed on the screen, and a size and a location of each window is arbitrary. The size and the location of the window can be modified by dragging the window by a user. In addition, different windows may be displayed in a cascade manner. The plurality of windows displayed on the screen may or may not occupy the entire screen.

Figure 3A:
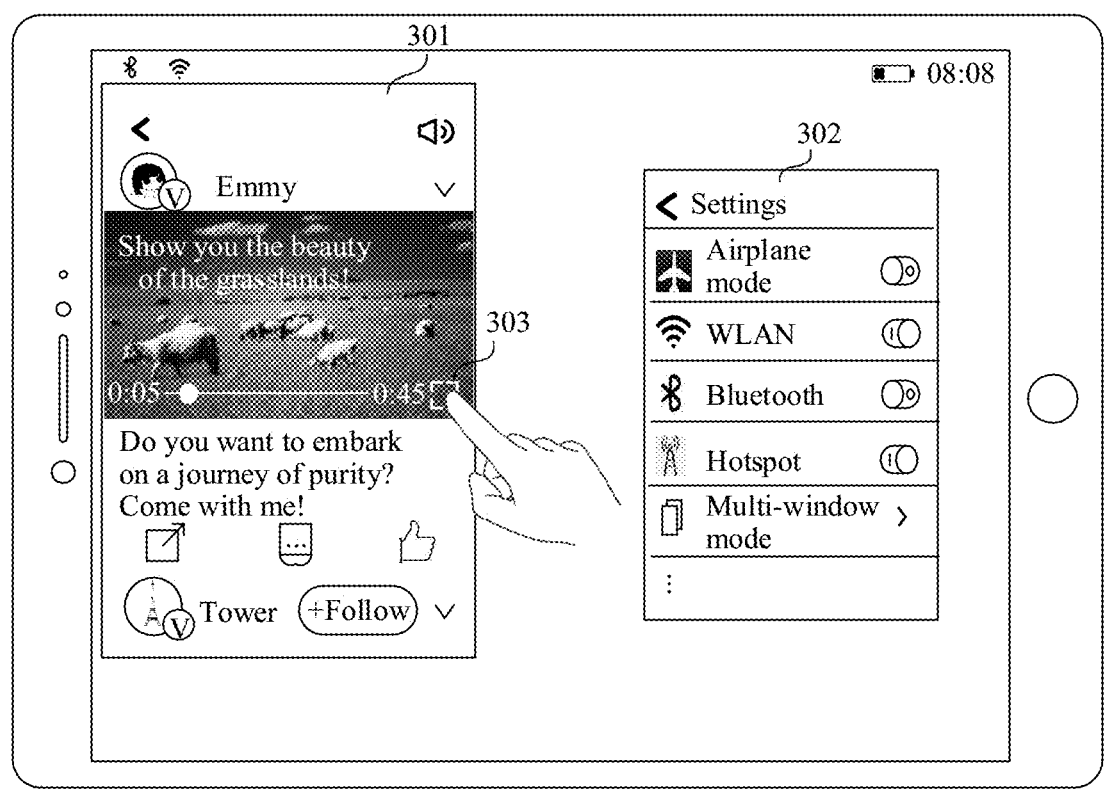
FIG. 3A is a diagram of a multi-window display interface according to an embodiment of this application.

For example, as shown in FIG. 3A, in a free multi-application multi-window scenario, a plurality of windows displayed on a screen may include a window 301 corresponding to a Weibo application and a window 302 corresponding to a setting application.

Figure 3B:
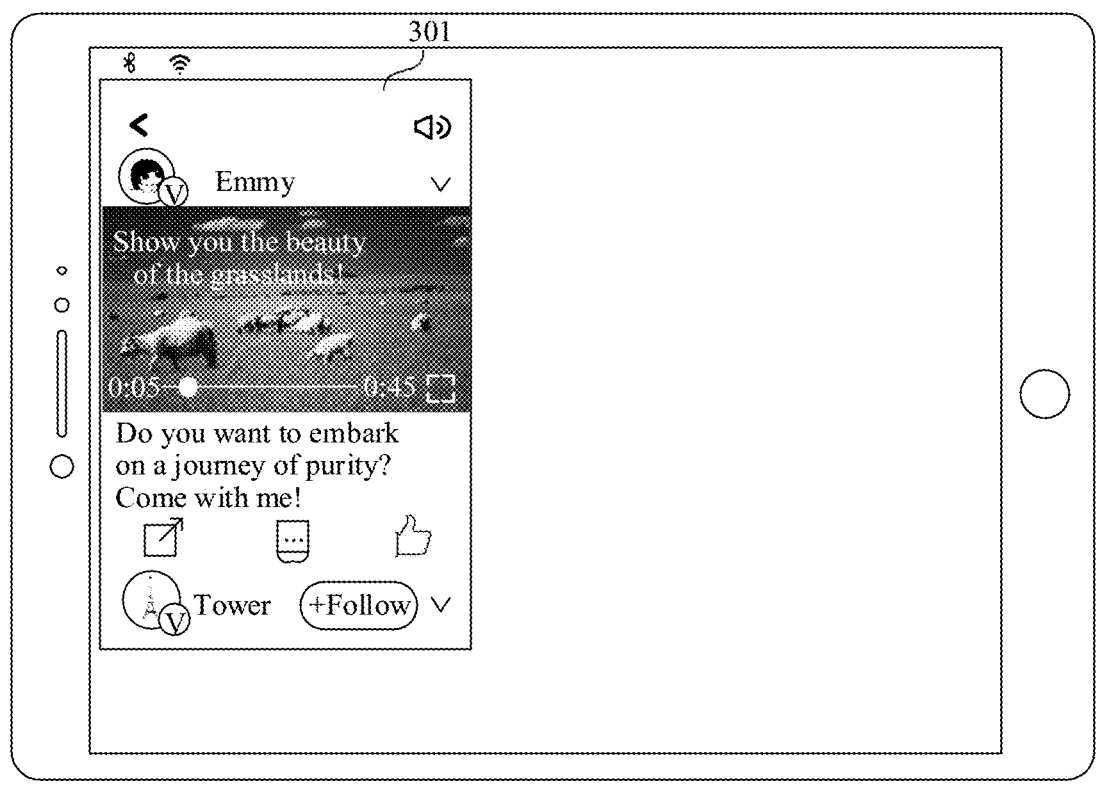
FIG. 3B is a diagram of another multi-window display interface according to an embodiment of this application.

It should be noted that, different from an existing scenario in which a single window covers the entire screen, and only the window can be displayed on the entire screen, a case in which only one window is included in the screen may also occur in the multi-window scenario. For example, in a free multi-application multi-window scenario, as shown in FIG. 3B, a size of the window 301 displayed on the screen is definitely less than a size of the screen, and another window may be further displayed on the screen when the window 301 is displayed on the screen, for example, the window 302 shown in FIG. 3A may be further displayed. Therefore, the case shown in FIG. 3B also belongs to the multi-window scenario.

Figure 5A:
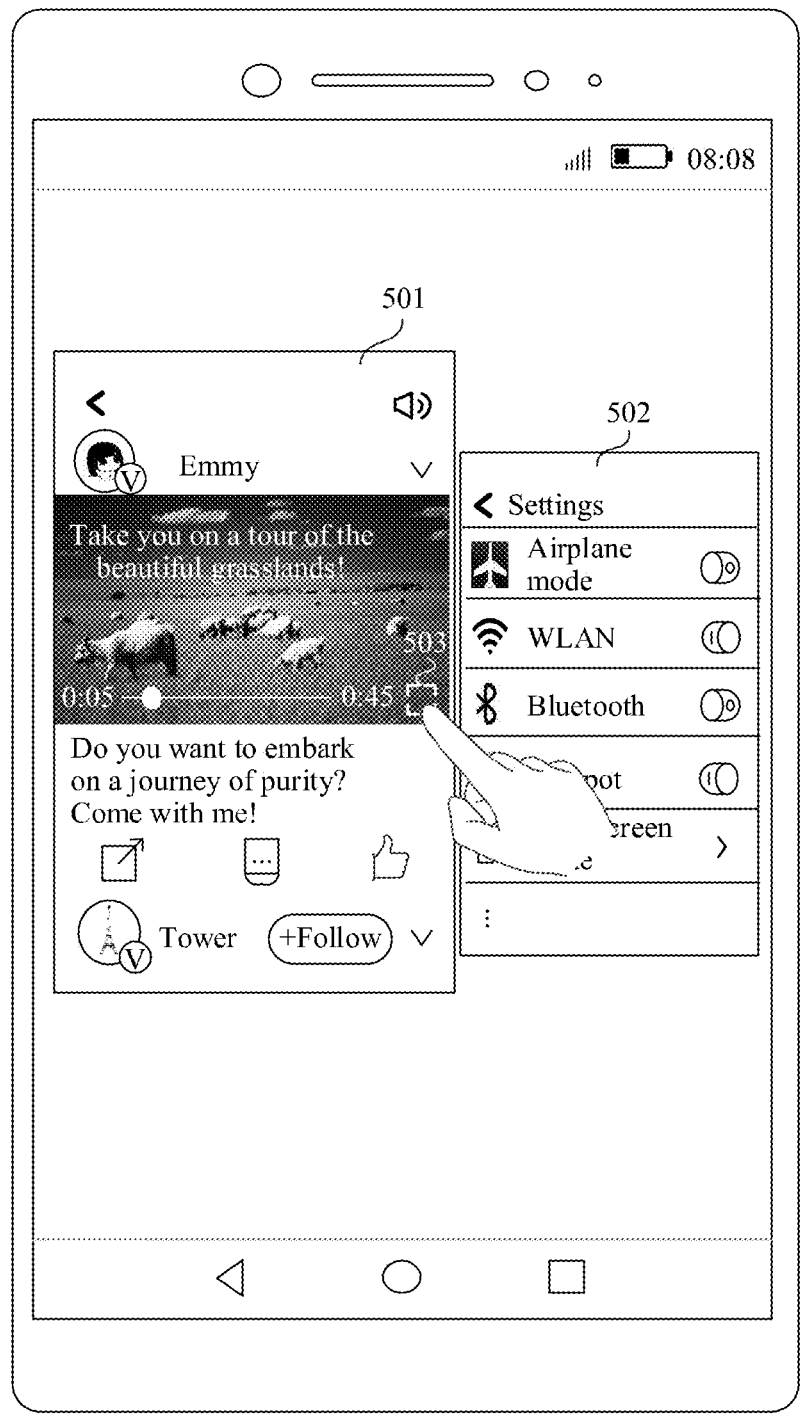
FIG. 5A is a diagram of another multi-window display interface according to an embodiment of this application.
Figure 5B:
FIG. 5B is a diagram of another full-screen display interface according to an embodiment of this application.
Figure 5C:
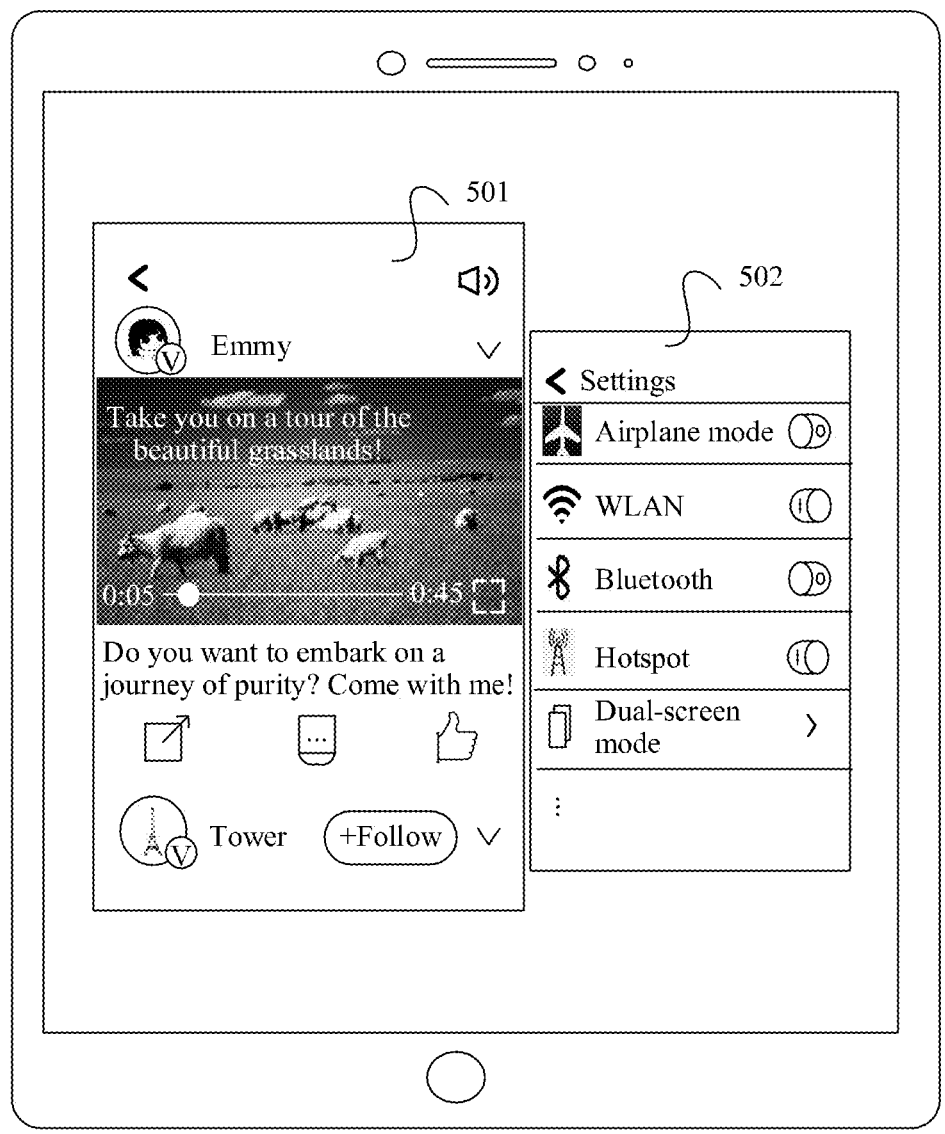
FIG. 5C is a diagram of another multi-window display interface according to an embodiment of this application.

For another example, as shown in FIG. 5A or FIG. 5C, in a free multi-application multi-window scenario, a plurality of windows displayed on a screen may include a window 501 corresponding to a Weibo application and a window 502 corresponding to a setting application.

For another example, in a single-application multi-window scenario, a plurality of windows of a same application may be displayed on a screen, and the plurality of windows usually do not overlap with each other.

Figure 6A:
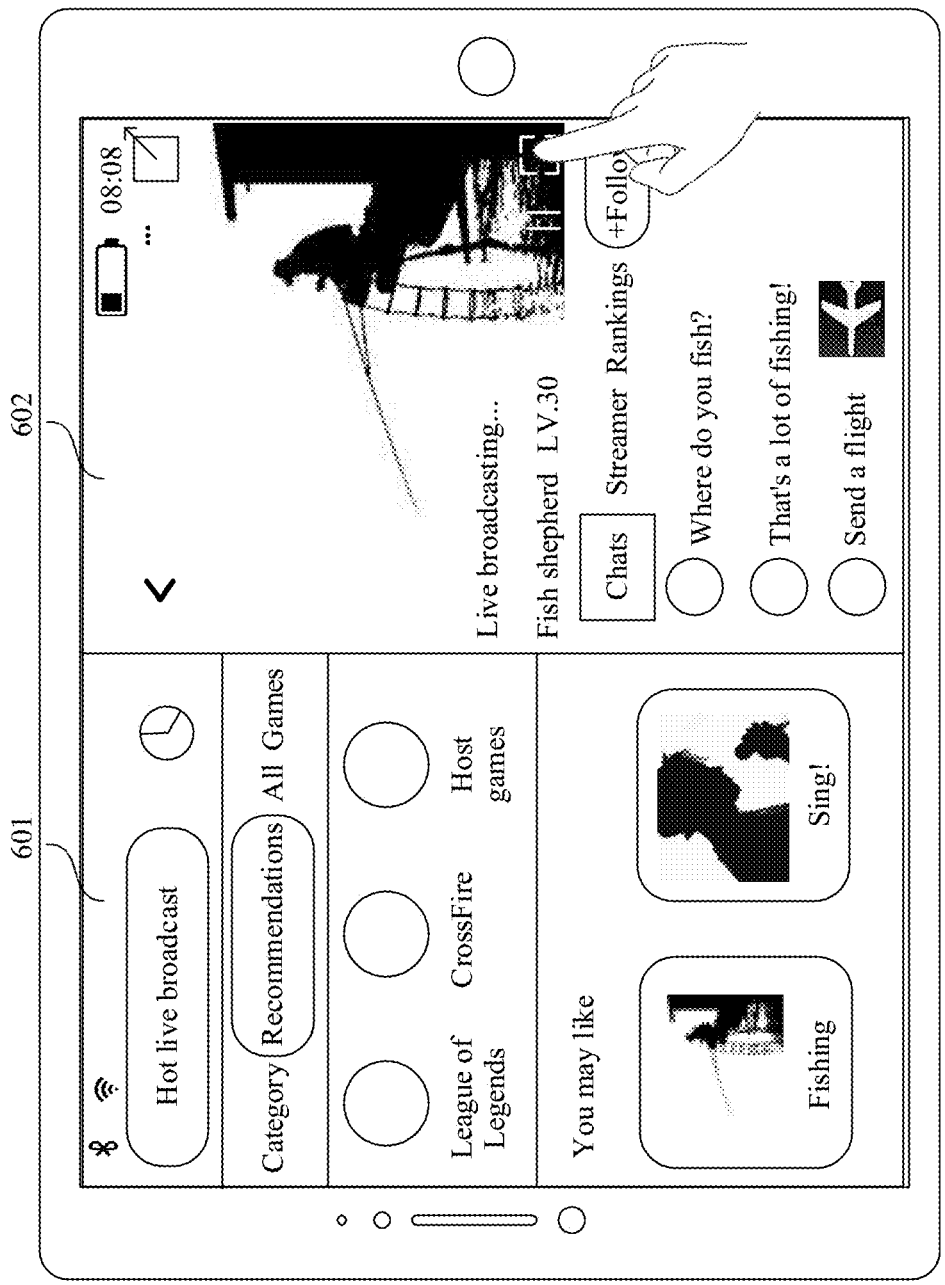
FIG. 6A is a diagram of another multi-window display interface according to an embodiment of this application.
Figure 6B:
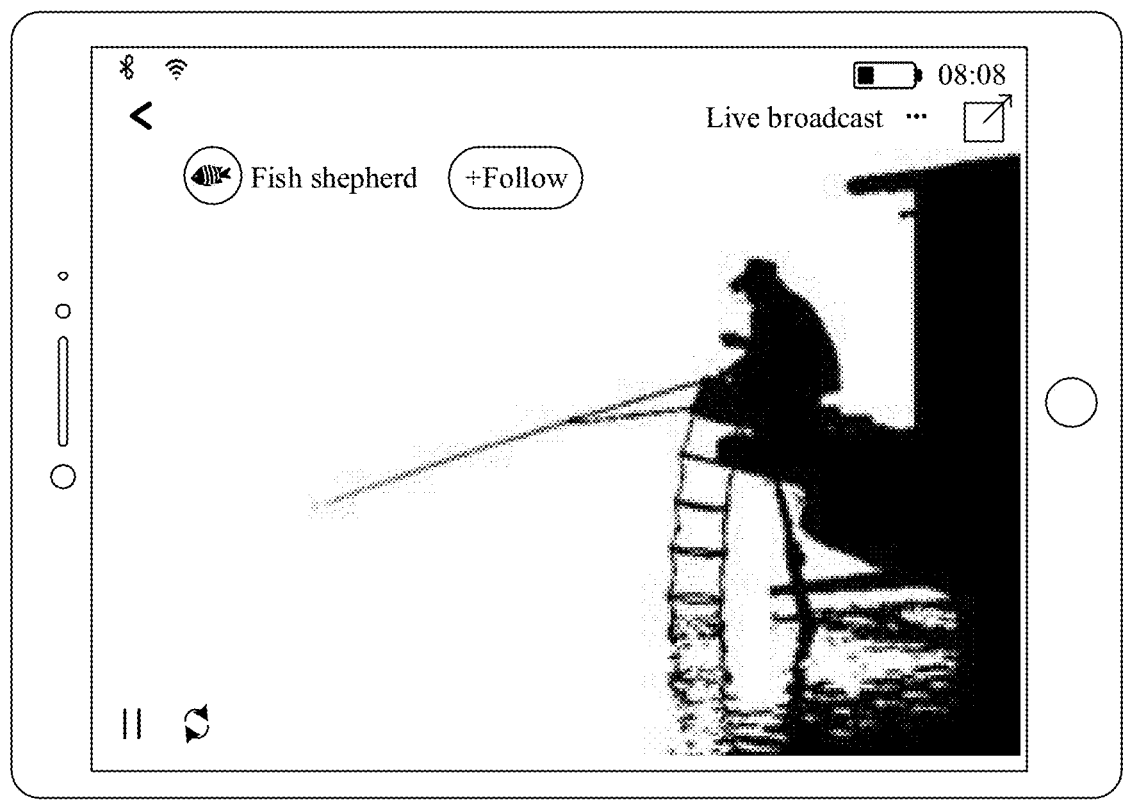
FIG. 6B is a diagram of another full-screen display interface according to an embodiment of this application.
Figure 6C:
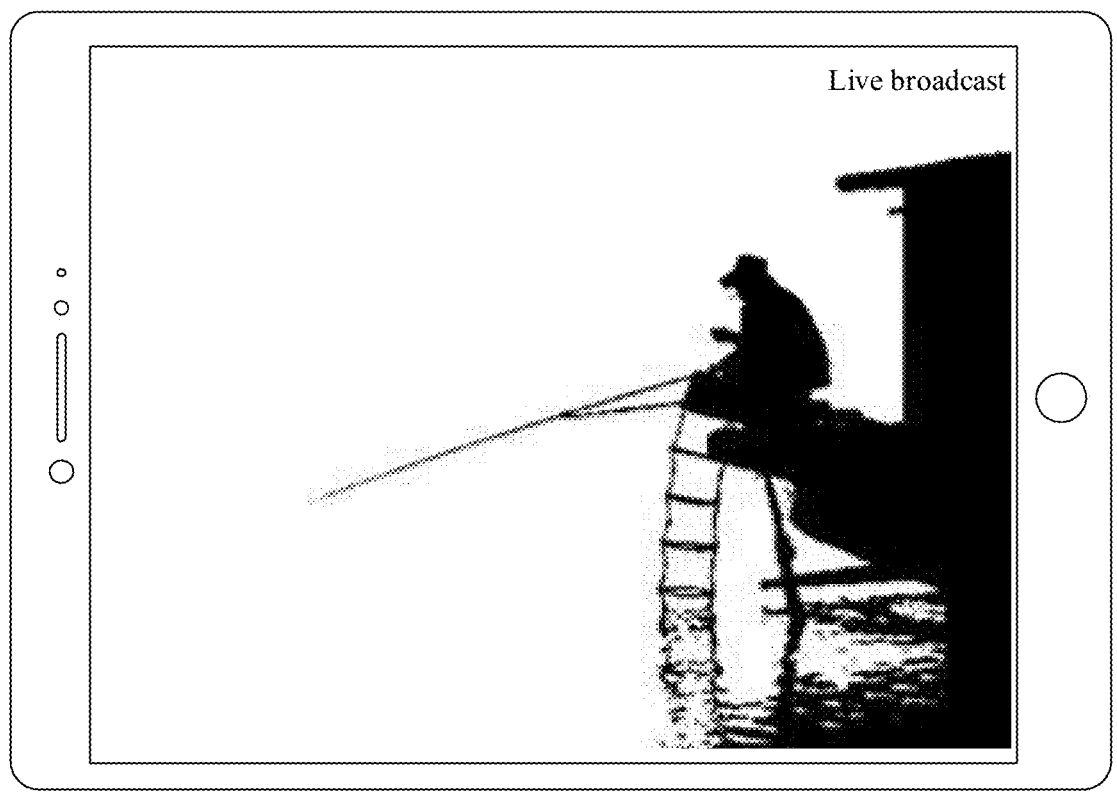
FIG. 6C is a diagram of another full-screen display interface according to an embodiment of this application.
Figure 6D:
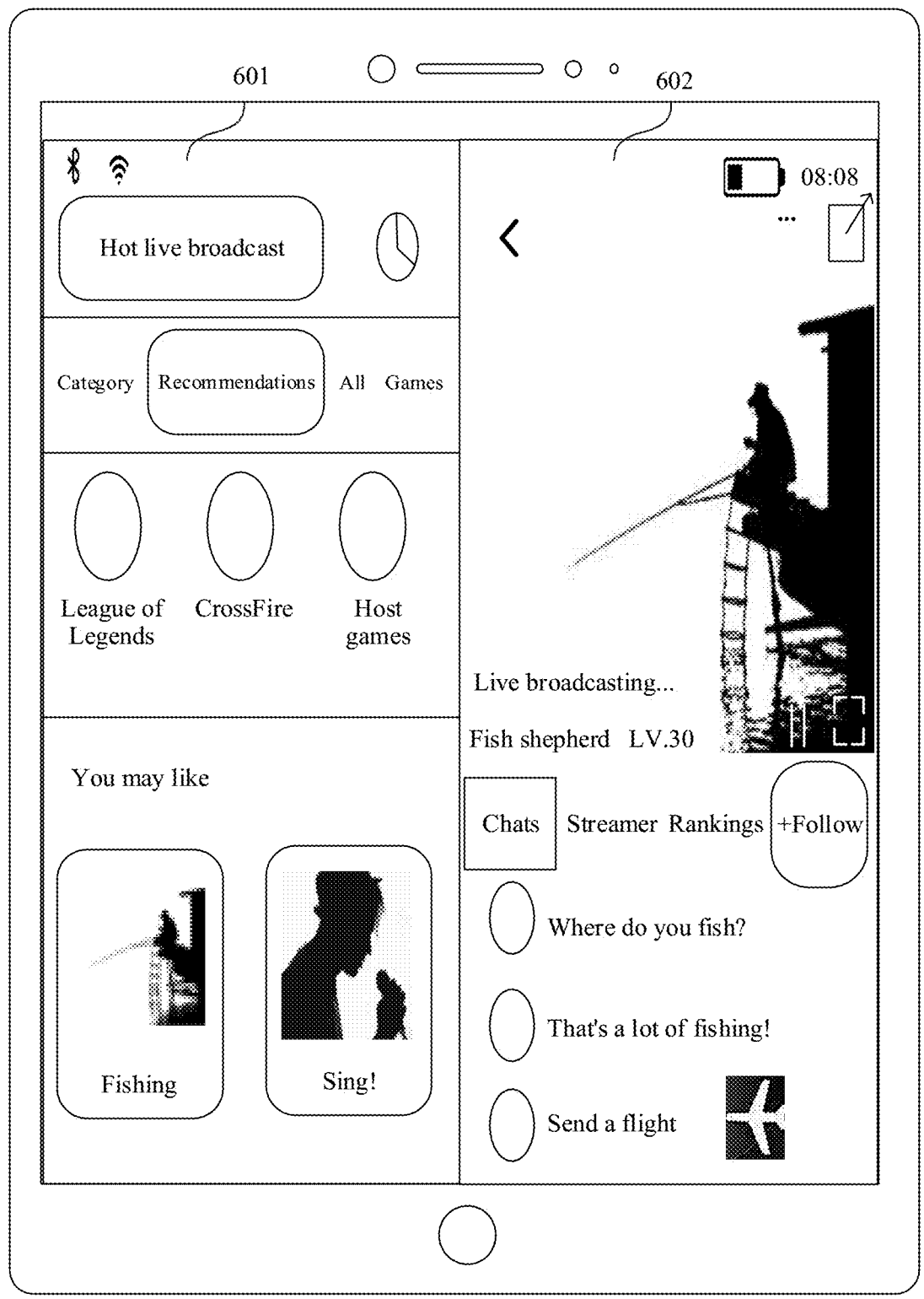
FIG. 6D is a diagram of another multi-window display interface according to an embodiment of this application.

For example, as shown in FIG. 6A or FIG. 6D, in a single-application multi-window scenario, a plurality of windows displayed on a screen include a window 601 and a window 602 that correspond to a live broadcast application.

Figure 7A:
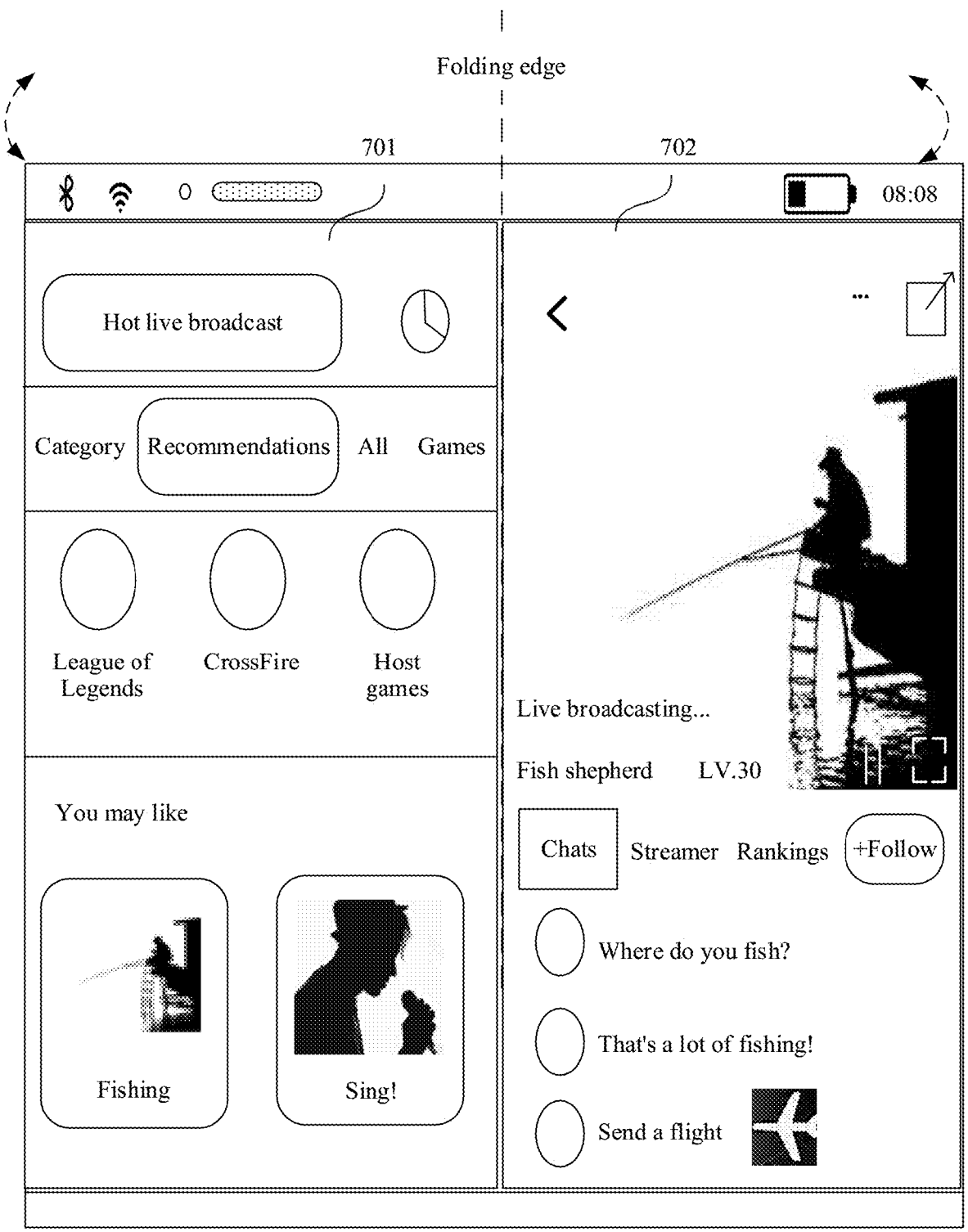
FIG. 7A is a diagram of another multi-window display interface according to an embodiment of this application.

For another example, as shown in FIG. 7A, when a screen of a foldable device is unfolded, in a single-application multi-window scenario, a plurality of windows displayed on the screen may include a window 701 and a window 702 that correspond to a live broadcast application.

For another example, in a split-screen multi-application multi-window scenario, windows respectively corresponding to different applications may be displayed in split-screen mode on a screen, different windows usually do not overlap with each other, and a plurality of windows displayed on the screen usually occupy an entire screen. For example, when a top-bottom split-screen mode is used, a window of an application 1 may be displayed on the top of a screen, and a window of an application 2 may be displayed on the bottom of the screen. For another example, when a left-right split-screen mode is used, a window of an application 1 may be displayed on the left of a screen, and a window of an application 2 may be displayed on the right of the screen.

Figure 1B:
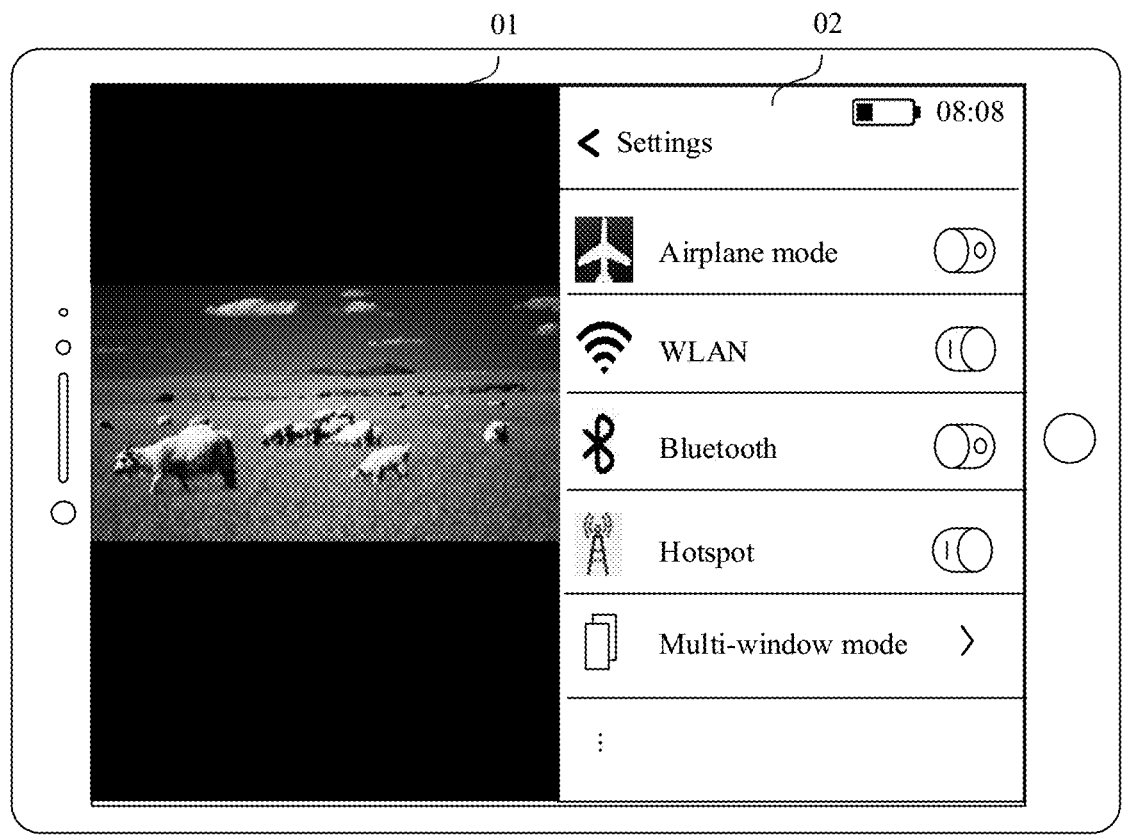
FIG. 1B is a diagram of a full-screen display interface according to the conventional technology.

For example, as shown in FIG. 1A, in a split-screen multi-application multi-window scenario, a plurality of windows displayed on a screen may include a window 01 corresponding to a Weibo application and a window 02 corresponding to a setting application.

Figure 8A:
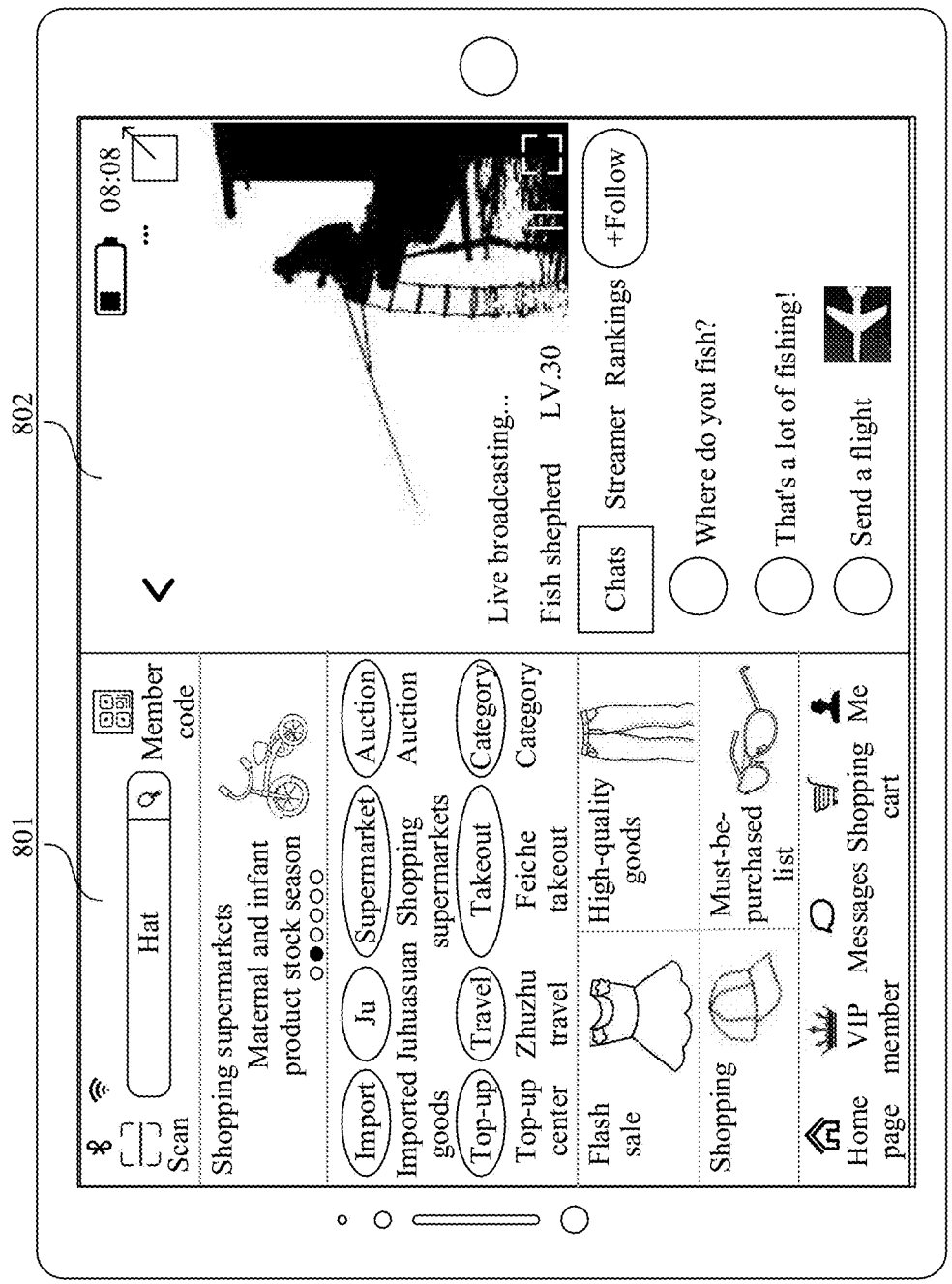
FIG. 8A is a diagram of another multi-window display interface according to an embodiment of this application.

For another example, as shown in FIG. 8A, in a split-screen multi-application multi-window scenario, a screen includes a window 801 and a window 802 that are displayed in left-right split-screen mode, the window 801 on the left of the screen corresponds to a Taobao application, and the window 802 on the right of the screen corresponds to a live broadcast application.

Figure 8B:
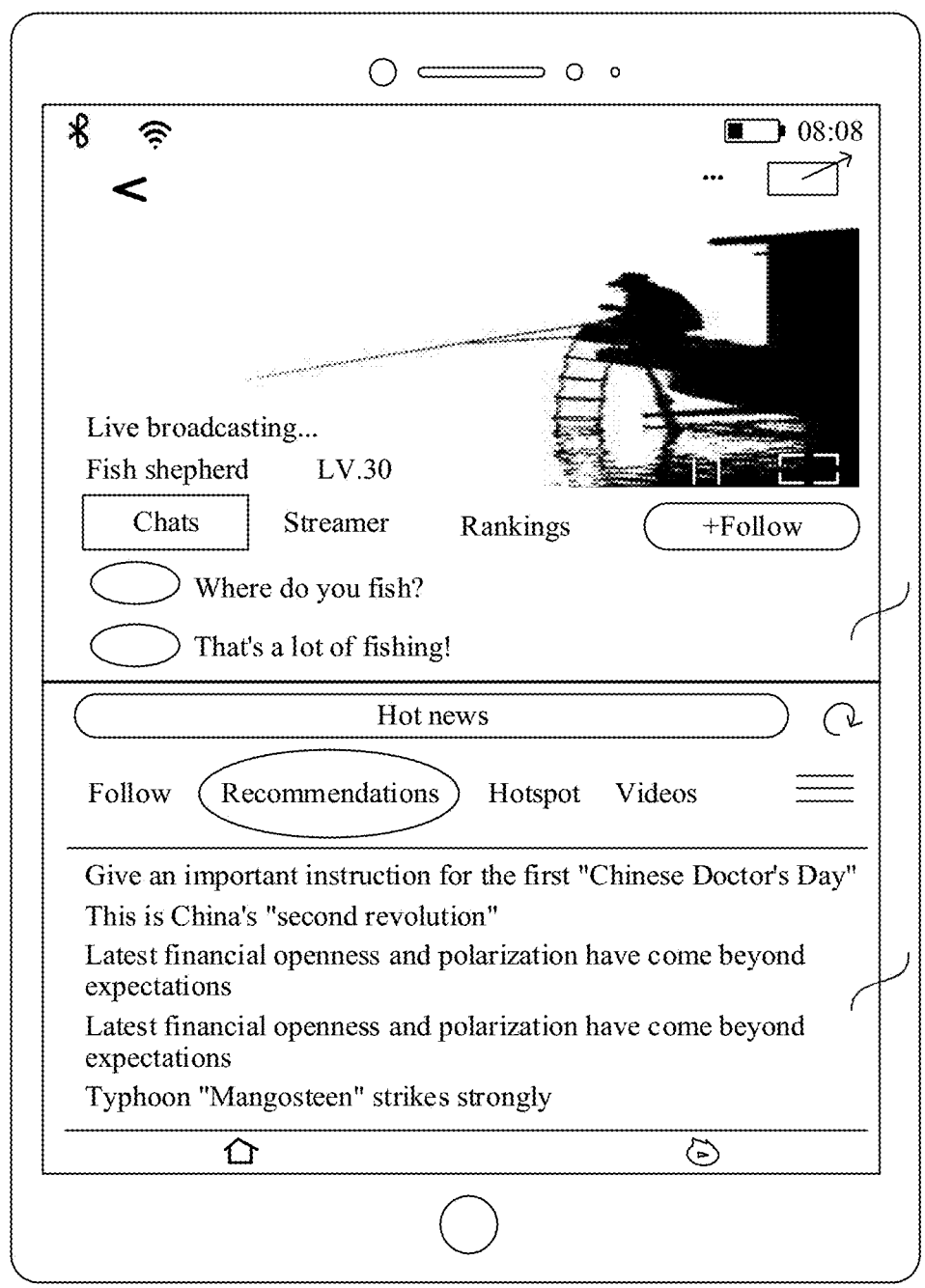
FIG. 8B is a diagram of another multi-window display interface according to an embodiment of this application.

For another example, as shown in FIG. 8B, in a split-screen multi-application multi-window scenario, a screen includes a window 803 and a window 804 that are displayed in top-bottom split-screen mode, the window 803 on the top of the screen corresponds to a live broadcast application, and the window 804 on the bottom of the screen corresponds to a Toutiao application.

Figure 9A:
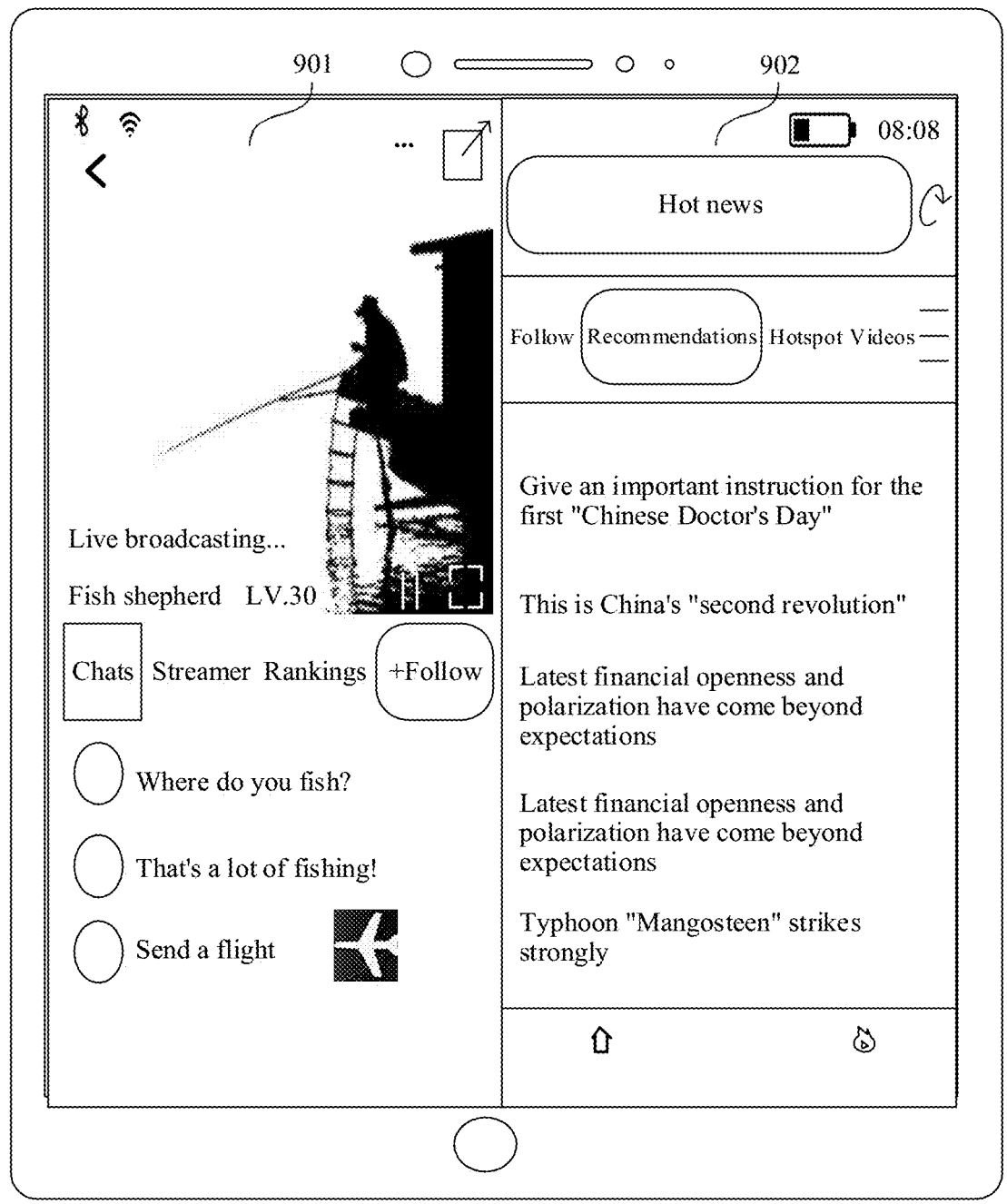
FIG. 9A is a diagram of another multi-window display interface according to an embodiment of this application.

For another example, as shown in FIG. 9A, in a split-screen multi-application multi-window scenario, a screen includes a window 901 and a window 902 that are displayed in left-right split-screen mode, the window 901 on the left of the screen corresponds to a live broadcast application, and the window 902 on the right of the screen corresponds to a Toutiao application.

In a multi-window scenario, after detecting an operation that is of a user and that indicates to play a video in full screen mode, the mobile terminal may store current multi-window status information, so that after exiting full-screen video play, the mobile terminal may restore a multi-window display status based on the multi-window status information. For example, the status information of the window may include width and height information of the window, and may further include a window mode (Window Mode) corresponding to the window, and location information. The window mode corresponds to an application, and each window in a same application is in a window mode of the application. A window mode of a window is a window mode of an application corresponding to the window.

After the mobile terminal detects the operation that is of the user and that indicates to play the video in full screen mode, a window in which the video is located may be referred to as a focus window (that is, a window that is last operated by the user), and an application corresponding to the focus window may be referred to as a focus application.

For example, refer to FIG. 3A. The operation that is of the user and that indicates to play the video in full screen mode may be an operation that the user taps a full-screen play control 303 in the window 301. For another example, the operation that is of the user and that indicates to play the video in full screen mode may be a double-tap operation performed by the user in a video play area in the window 301. For another example, the operation that is of the user and that indicates to play the video in full screen mode may be an operation that is of the user and that indicates, by using a voice or a gesture, to play the video in full screen mode, or the like.

In a multi-window scenario, after detecting the operation that is of the user and that indicates to play the video in full screen mode, the mobile terminal may determine whether to switch a display direction. The display direction includes a landscape direction and a portrait direction. The width (that is, a side that is of the display interface and that has a smaller included angle with a horizontal direction of the screen) of a display interface of a screen corresponding to the landscape direction is greater than the height (that is, a side that is of the display interface and that has a smaller included angle with a vertical direction of the screen) of the display interface. The width of a display interface of a screen corresponding to the portrait direction is less than the height of the display interface.

When the user uses the mobile terminal, a side that is of the screen of the mobile terminal and that is basically parallel to the horizontal direction (or has a smaller included angle) may be referred to as the width of the mobile terminal, and a side that is of the screen of the mobile terminal and that is basically parallel to the vertical direction (or has a smaller included angle) may be referred to as the height of the mobile terminal. A landscape state is a state in which the width of the mobile terminal is greater than the height of the mobile terminal. A portrait state is a state in which the height of the mobile terminal is greater than the width of the mobile terminal. When the user flips the mobile terminal to the landscape state, the mobile terminal may further display an interface in a landscape direction in cooperation with the landscape state. When the user flips the mobile terminal to the portrait state, the mobile terminal may further display an interface in a portrait direction in cooperation with the portrait state.

In some embodiments, the mobile terminal may determine, according to a preset policy, whether to switch a display direction. If the mobile terminal determines, according to the preset policy, that the display direction does not need to be switched, the mobile terminal displays a video play interface in full screen mode on the entire screen of the mobile terminal, to implement device-level full-screen video play interface display (or referred to as device-level full-screen video play). If the mobile terminal determines, according to the preset policy, that the display direction needs to be switched, after switching the display direction, the mobile terminal displays a video play interface in full screen mode on the entire screen of the mobile terminal, to implement device-level full-screen display.

For example, in a preset policy, if a difference between the width and the height of the screen of the mobile terminal is less than or equal to a preset value, that is, an aspect ratio of the screen (that is, a ratio between the width and the height of the screen) is close to 1:1, the width and the height of the screen differ slightly, and the screen is close to square. In this case, display effects of the mobile terminal in the landscape state and the portrait state differ slightly. Therefore, after detecting the operation that is of the user and that indicates to play the video in full screen mode, the mobile terminal does not switch the display direction regardless of whether the mobile terminal is currently in the landscape state or the portrait state.

Figure 7B:
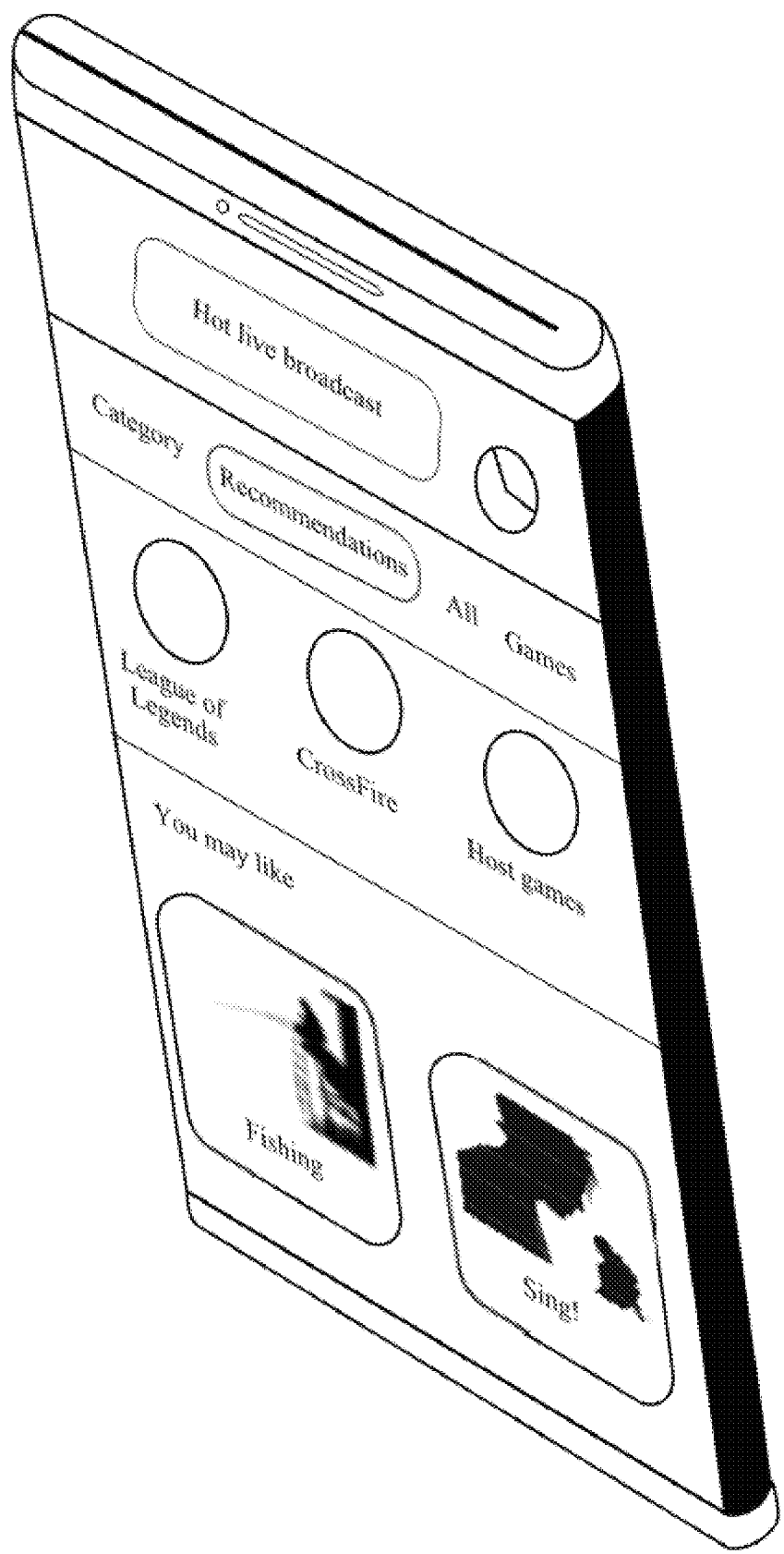
FIG. 7B is a schematic diagram of a screen folded state according to an embodiment of this application.

For example, for some foldable devices (for example, foldable phones), when the screen is folded (as shown in FIG. 7B), a difference between the width and the height of the screen is large. When the screen is unfolded (as shown in FIG. 7A), a difference between the width and the height of the screen is small, and an aspect ratio of the screen is close to 1:1. After detecting, in an unfolded state, the operation that is of the user and that indicates to play the video in full screen mode, the foldable device does not switch the display direction regardless of whether the foldable device is currently in the landscape state or the portrait state.

If the difference between the width and the height of the screen of the mobile terminal is greater than the preset value, the width and the height of the screen differ greatly. In this case, display effects of the mobile terminal in the landscape state and the portrait state differ greatly, and a device-level full-screen display effect of the mobile terminal in the landscape state is better. Therefore, after the mobile terminal detects the operation that is of the user and that indicates to play the video in full screen mode, if the mobile terminal is currently in the portrait state, and the current display direction is the portrait direction, the mobile terminal may switch the display direction to the landscape direction, and then display the video play interface in full screen mode on the entire screen. For ease of viewing, the user may flip the mobile terminal to the landscape state, to correspond to the landscape direction. If the mobile terminal is currently in the landscape state, and the current display direction is the landscape direction, the mobile terminal does not switch the display direction, and may directly display the video play interface in full screen mode on the entire screen.

In some other embodiments, in a multi-window scenario, after detecting the operation that is of the user and that indicates to play the video in full screen mode, if the mobile terminal is currently in the portrait state, and the display direction is the portrait direction, the mobile terminal may prompt, by displaying information, by using a voice, or in another manner, the user to determine whether to switch the display direction. If the mobile terminal detects an operation that is of the user and that indicates, by tapping a control, by using a voice or a gesture, or the like, the mobile terminal to switch the display direction, the mobile terminal switches the portrait direction to the landscape direction. If the mobile terminal detects an operation that is of the user and that indicates the mobile terminal not to switch the landscape/portrait direction, or does not detect, within preset duration, an operation that is of the user and that indicates to switch the landscape/portrait direction, the mobile terminal does not switch the landscape/portrait direction, and keeps the current landscape direction or portrait direction unchanged. For ease of viewing, the mobile terminal may further prompt the user to flip the mobile terminal to the landscape state, to correspond to the landscape direction.

Figure 10A:
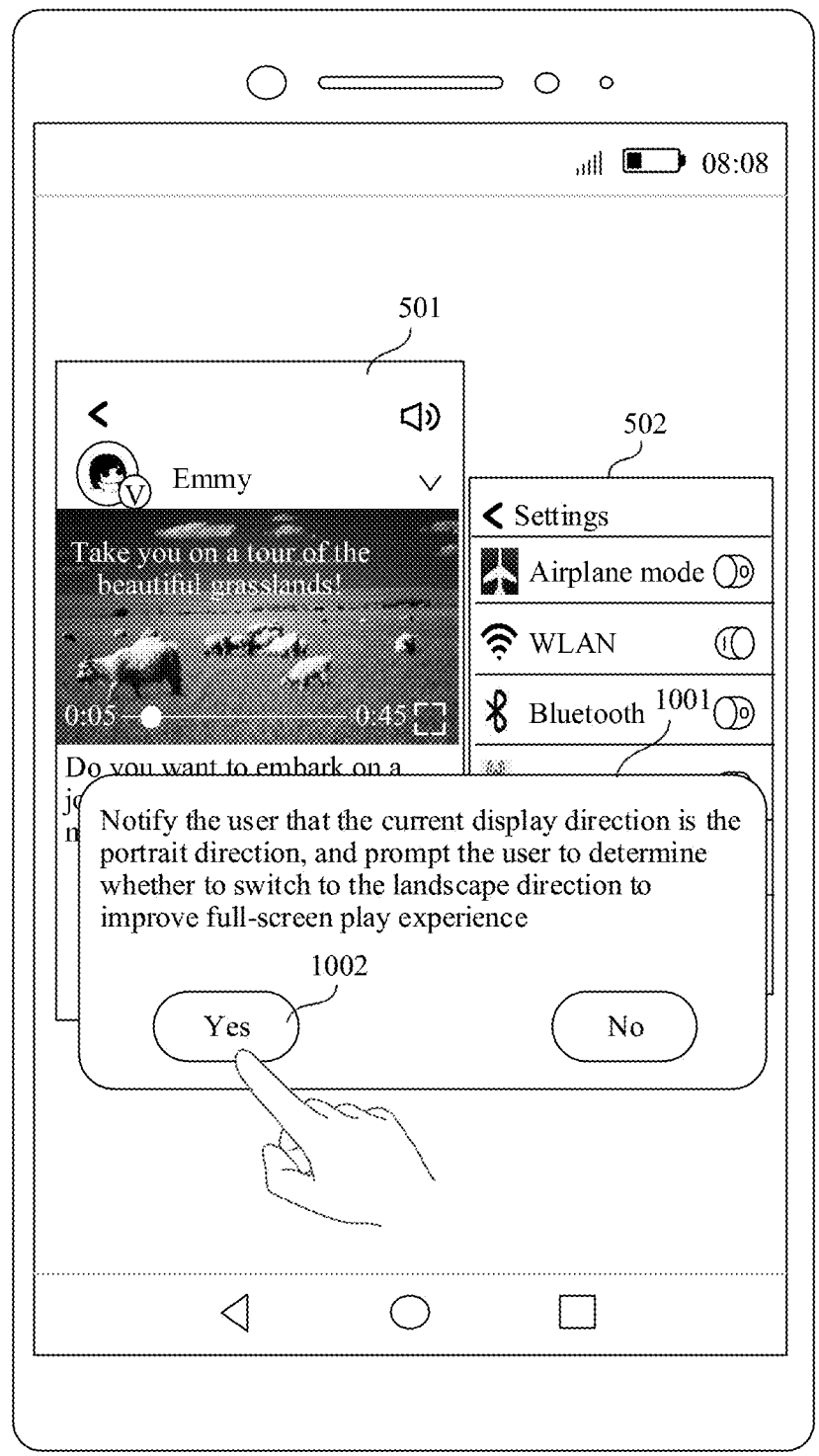
FIG. 10A is a schematic diagram of prompt information according to an embodiment of this application.
Figure 10B:
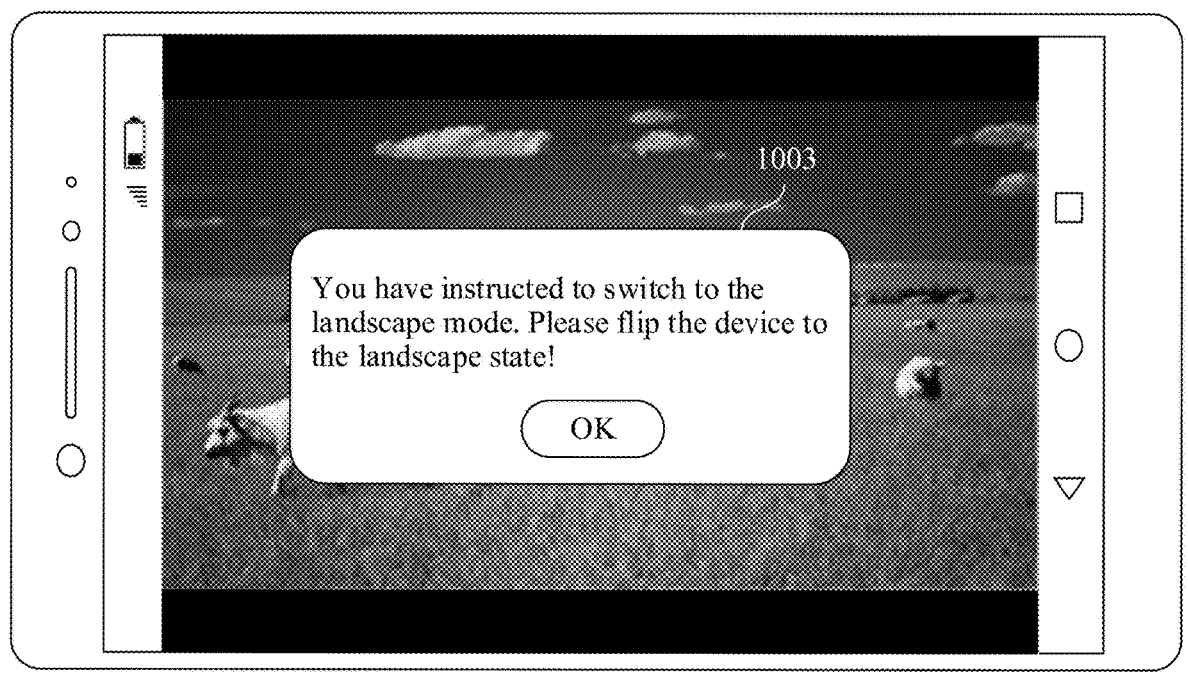
FIG. 10B is a schematic diagram of other prompt information according to an embodiment of this application.

For example, in the multi-window scenario shown in FIG. 5A, after detecting an operation of tapping a full-screen play control 503 in the window 501 by the user, as shown in FIG. 10A, the mobile terminal displays a prompt box 1001, to notify the user that the current display direction is the portrait direction, and prompt the user to determine whether to switch to the landscape direction to improve full-screen play experience. If the mobile terminal detects an operation of tapping a control 1002 by the user, the mobile terminal switches the display direction from the portrait direction to the landscape direction. In addition, after detecting the operation of tapping the control 1002 by the user, as shown in FIG. 10B, the mobile terminal may further display a prompt box 1003, to prompt the user to flip the mobile terminal to the landscape state, so as to perform display in the landscape direction in the landscape state. After the user flips the mobile terminal to the landscape state, as shown in FIG. 5B, the mobile terminal may play a video in full screen mode on the entire display in the landscape direction in the landscape state.

Figure 11:
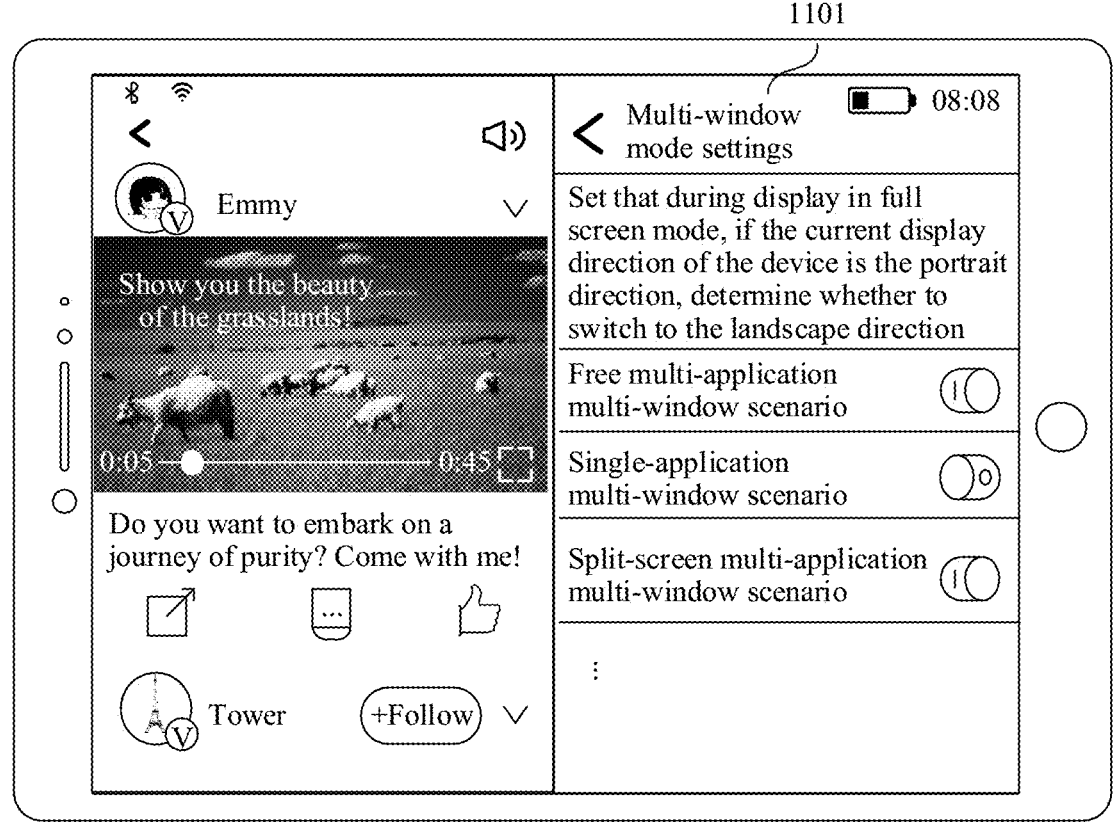
FIG. 11 is a schematic diagram of a setting interface according to an embodiment of this application.

In some other embodiments, the user may perform a preset setting in a system or a video application. After the mobile terminal detects that the user indicates to play the video in full screen mode, if the mobile terminal is currently in the portrait state and the portrait direction, the mobile terminal determines whether to switch the display direction. The mobile terminal determines, based on a user setting, whether to switch the display direction. For example, for a setting interface, refer to an interface in a window 1101 shown in FIG. 11.

When the video play interface is displayed in full screen mode on the entire screen of the mobile terminal, to implement device-level full-screen display, the entire screen of the mobile terminal is used to display the video play interface. A size of the video play interface is the same as a size of the screen.

In some embodiments, when the video play interface is displayed in full screen mode on the entire screen of the mobile terminal, to implement device-level full-screen display, the entire screen of the mobile terminal is used to display a window, the window is used to play a video, a size of the window is the same as a size of the screen, and a size of a video picture matches the size of the screen. The mobile terminal no longer displays another window of a focus application and a window of another application on the screen.

Figure 4A:
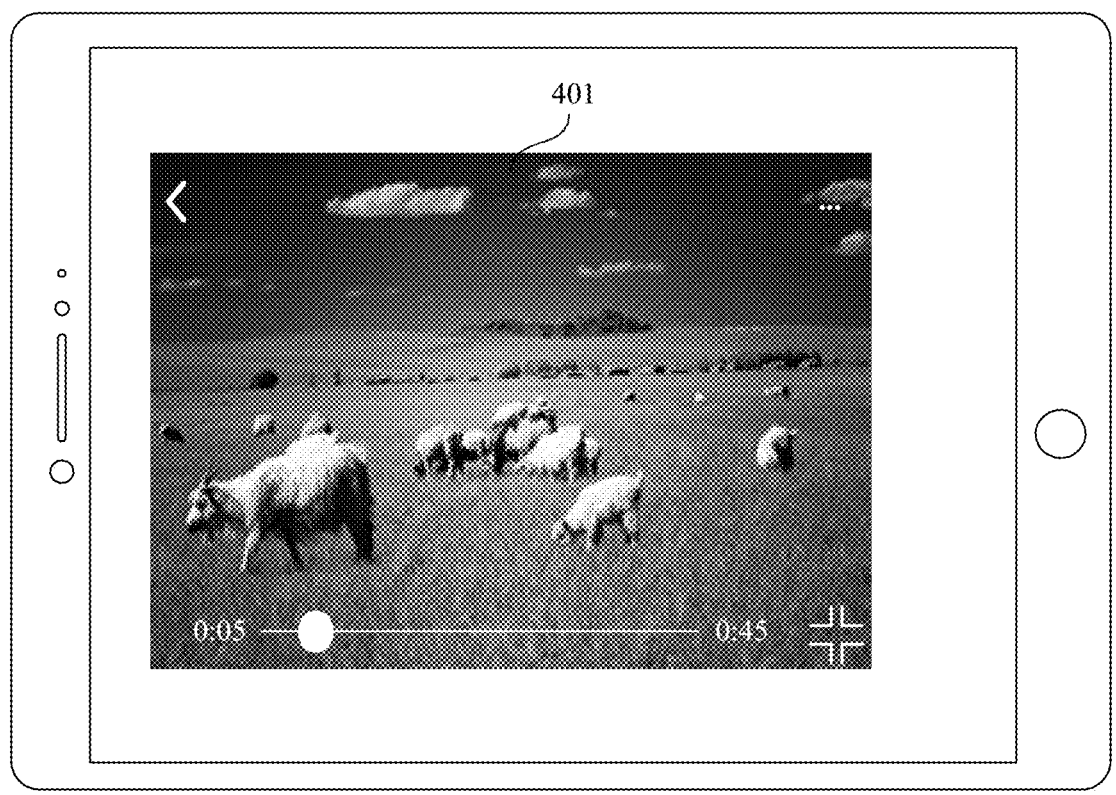
FIG. 4A is a diagram of a full-screen display interface according to an embodiment of this application.

For example, in the scenario shown in FIG. 1A, FIG. 3A, or FIG. 3B, for a schematic diagram in which the mobile terminal plays the video in full screen mode on the entire screen, refer to FIG. 4A. As shown in FIG. 4A, only one full-screen play window 401 is displayed on an entire screen. The full-screen play window is smaller than the screen. However, the full-screen play window is larger than the window of the Weibo application shown in FIG. 1A, FIG. 3A, or FIG. 3B. In this way, compared with the window of the Weibo application shown in FIG. 1A, FIG. 3A, or FIG. 3B in which the video is played in full screen mode, in an interface shown in FIG. 4A, a range for displaying a video play picture is larger, and content in another window is not displayed. Therefore, the user does not see interference information in the another window. Therefore, a full-screen play effect shown in FIG. 4A may provide better viewing experience for the user.

Figure 4B:
FIG. 4B is a diagram of another full-screen display interface according to an embodiment of this application.
Figure 4C:
FIG. 4C is a diagram of another full-screen display interface according to an embodiment of this application.

For example, in the scenario shown in FIG. 1A, FIG. 3A, or FIG. 3B, for a schematic diagram in which the mobile terminal plays the video in full screen mode on the entire screen, refer to FIG. 4B or FIG. 4C. As shown in FIG. 4B or FIG. 4C, a size of the full-screen play window is the same as or basically the same as a size of the screen. A full-screen play effect shown in FIG. 4B and FIG. 4C may provide better immersive viewing experience for the user.

In the following embodiments of this application, descriptions are provided mainly by using an example in which a size of a window in which a video is played in full screen mode (that is, a window in which a target object is displayed in full screen mode) is the same as or basically the same as a size of a screen.

When the video is played in full screen mode, mutual switching may be performed between an interface shown in FIG. 4B and an interface shown in FIG. 4C. For example, when the mobile terminal displays the interface shown in FIG. 4B, if the mobile terminal detects a tap operation performed by the user in the interface, the mobile terminal switches to the interface shown in FIG. 4C. When the mobile terminal displays the interface shown in FIG. 4C, if the mobile terminal detects a tap operation performed by the user in the interface, the mobile terminal switches to the interface shown in FIG. 4B.

It should be noted that device-level full-screen display means that the video play interface basically fills the entire screen of the mobile terminal, and some areas of the screen may be reserved for a status indicator, a notification message, and the like. Device-level full-screen display does not require a video picture to fully occupy all areas of the screen. For example, as shown in FIG. 4B and FIG. 4C, the video picture may cover the entire width of the screen horizontally, but a blank edge is left between the video picture and each of an upper edge line and a lower edge line of the screen vertically, to adapt to a picture proportion of the video picture.

The following separately describes a display direction and a full-screen video play situation in different application scenarios by using examples.

For example, in a free multi-application multi-window scenario, after detecting an operation that is of a user and that indicates to play a video in full screen mode, the mobile terminal determines whether to switch a display direction, and then displays a video play interface in full screen mode on an entire screen of the mobile terminal.

For example, as shown in FIG. 3A or FIG. 3B, in a free multi-application multi-window scenario, the mobile terminal is in a landscape state, and a display direction is a landscape direction. After detecting the operation that is of the user and that indicates to play the video in full screen mode, as shown in FIG. 4B or FIG. 4C, the mobile terminal displays the video play interface in full screen mode in a landscape state.

For example, as shown in FIG. 5A, in a free multi-application multi-window scenario, the mobile terminal is in a portrait state, and a display direction is a portrait direction.

After detecting the operation that is of the user and that indicates to play the video in full screen mode, the mobile terminal switches to a landscape direction, and as shown in FIG. 5B, displays the video play interface in full screen mode in a landscape state.

Figure 5D:
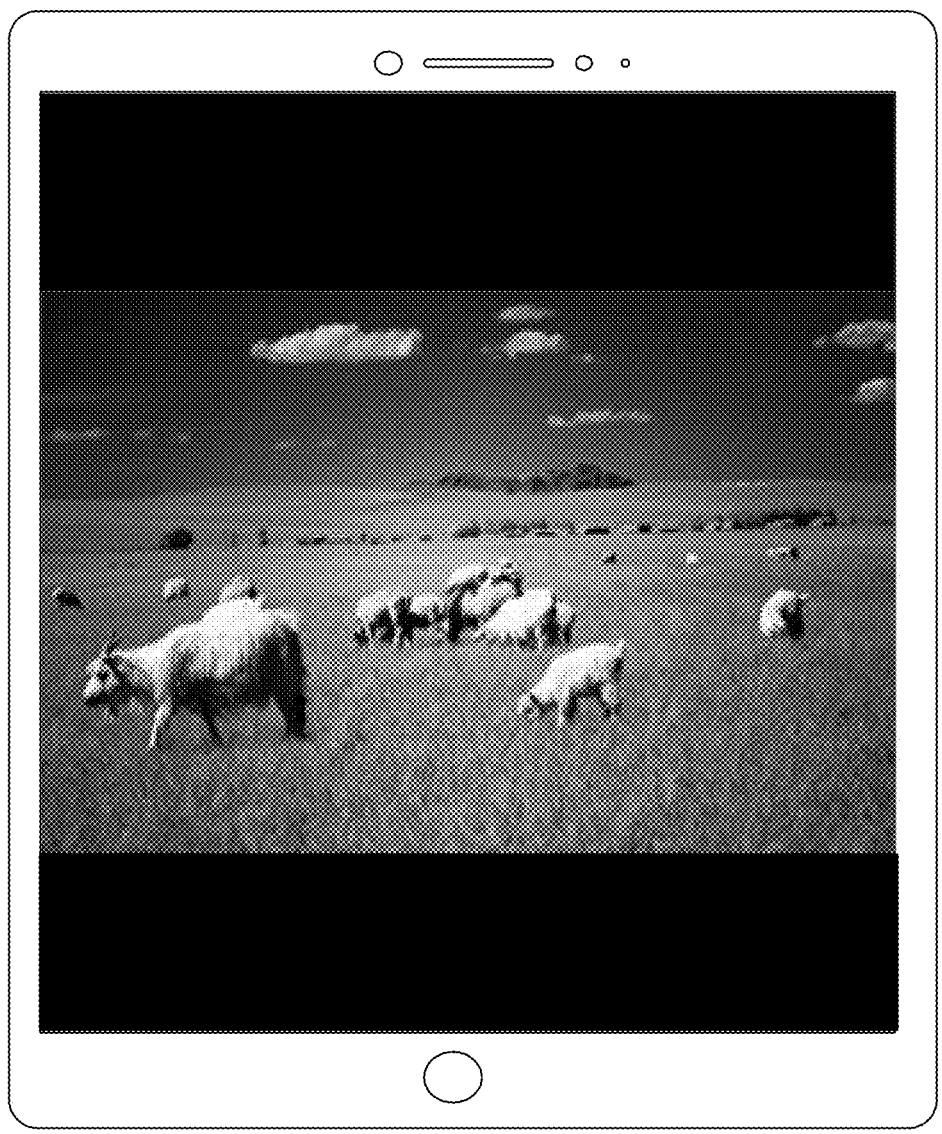
FIG. 5D is a diagram of another full-screen display interface according to an embodiment of this application.

For example, as shown in FIG. 5C, in a free multi-application multi-window scenario, the mobile terminal is in a portrait state, and a display direction is a portrait direction. After detecting the operation that is of the user and that indicates to play the video in full screen mode, as shown in FIG. 5D, the mobile terminal displays the video play interface in full screen mode in a portrait state.

For another example, in a single-application multi-window scenario, after detecting an operation that is of a user and that indicates to play a video in full screen mode, the mobile terminal determines whether to switch a display direction, and then displays a video play interface in full screen mode on an entire screen of the mobile terminal.

For example, as shown in FIG. 6A, in a single-application multi-window scenario, the mobile terminal is in a landscape state, and a display direction is a landscape direction. After detecting the operation that is of the user and that indicates to play the video in full screen mode, as shown in FIG. 6B or FIG. 6C, the mobile terminal displays the video play interface in full screen mode in a landscape state.

For example, as shown in FIG. 6D, in a single-application multi-window scenario, the mobile terminal is in a portrait state, and a display direction is a portrait direction. After detecting the operation that is of the user and that indicates to play the video in full screen mode, the mobile terminal switches to a landscape direction, and as shown in FIG. 6B or FIG. 6C, displays the video play interface in full screen mode in a landscape state.

Figure 7C:
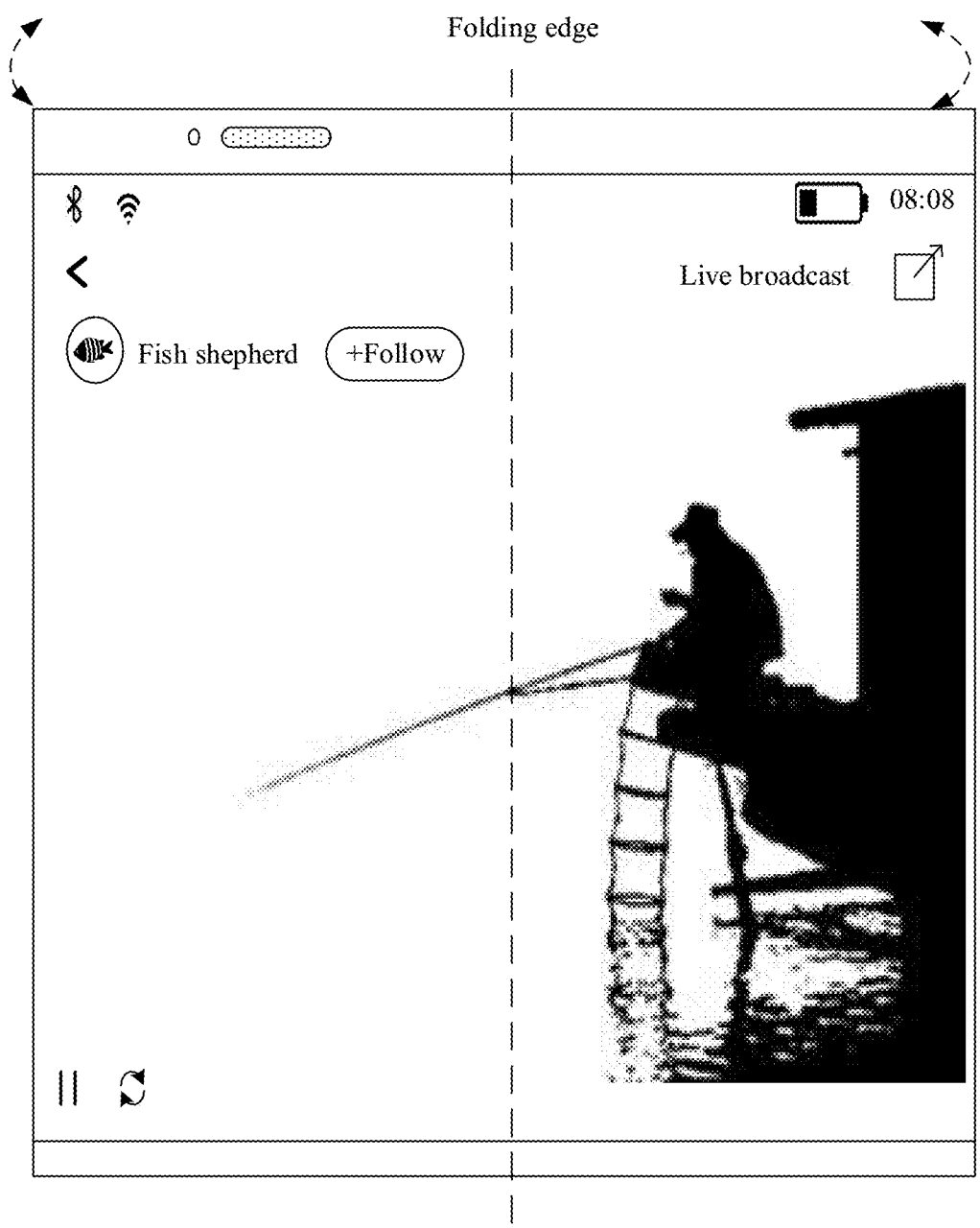
FIG. 7C is a diagram of another full-screen display interface according to an embodiment of this application.

For example, as shown in FIG. 7A, in a single-application multi-window scenario, the mobile terminal is in a portrait state, and a display direction is a portrait direction. After detecting the operation that is of the user and that indicates to play the video in full screen mode, as shown in FIG. 7C, the mobile terminal displays the video play interface in full screen mode in a portrait state.

For another example, in a split-screen multi-application multi-window scenario, after detecting an operation that is of a user and that indicates to play a video in full screen mode, the mobile terminal may determine whether to switch a display direction, and then display a video play interface in full screen mode on an entire screen of the mobile terminal.

For example, as shown in FIG. 1A, in a split-screen multi-application multi-window scenario, the mobile terminal is in a landscape state, and a display direction is a landscape direction. After detecting the operation that is of the user and that indicates to play the video in full screen mode, as shown in FIG. 4B or FIG. 4C, the mobile terminal displays the video play interface in full screen mode in a landscape state.

For another example, as shown in FIG. 8A, in a split-screen multi-application multi-window scenario, the mobile terminal is in a landscape state, and a display direction is a landscape direction. After detecting the operation that is of the user and that indicates to play the video in full screen mode, as shown in FIG. 6B or FIG. 6C, the mobile terminal displays the video play interface in full screen mode in a landscape state.

For example, as shown in FIG. 8B, in a split-screen multi-application multi-window scenario, the mobile terminal is in a portrait state, and a display direction is a portrait direction. After detecting the operation that is of the user and that indicates to play the video in full screen mode, the mobile terminal switches to a landscape direction, and as shown in FIG. 6B or FIG. 6C, displays the video play interface in full screen mode in a landscape state.

Figure 9B:
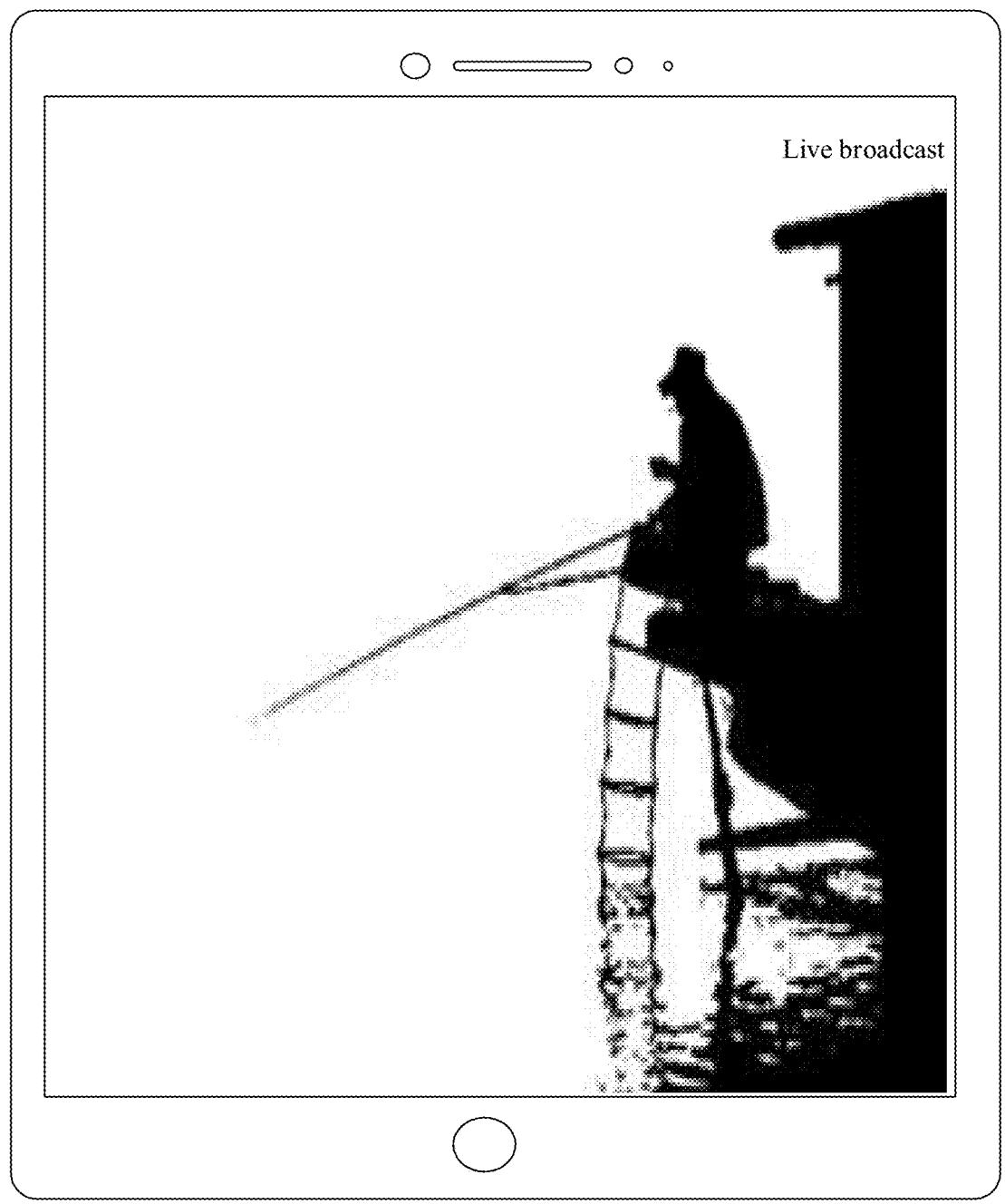
FIG. 9B is a diagram of another full-screen display interface according to an embodiment of this application.

For example, as shown in FIG. 9A, in a split-screen multi-application multi-window scenario, the mobile terminal is in a portrait state, and a display direction is a portrait direction. After detecting the operation that is of the user and that indicates to play the video in full screen mode, as shown in FIG. 9B, the mobile terminal displays the video play interface in full screen mode in a portrait state.

When a ratio between a long side and a short side of the mobile terminal is much greater than 1:1, that is, a difference between the width and the height of the screen of the mobile terminal is usually greater than a preset value, the mobile terminal may play a video in full screen mode in a landscape state. For example, this case may correspond to the scenario shown in FIG. 4B or FIG. 6B. For example, the mobile terminal may be a mobile device whose long side and short side differ greatly, for example, a tablet computer or a mobile phone.

When a ratio between a long side and a short side of the mobile terminal is close to 1:1, that is, a difference between the width and the height of the screen of the mobile terminal is usually less than or equal to a preset value, the mobile terminal may display a video play interface in full screen mode in a landscape state, or may display a video play interface in full screen mode in a portrait state. For example, this case may correspond to the scenario shown in FIG. 5D, FIG. 7C, or FIG. 9B. For example, the mobile terminal may be a device whose long side and short side differ slightly, for example, a foldable device in an unfolded state. For example, the foldable device is a foldable phone. An aspect ratio of the screen in a folded state may be 16:9, and an aspect ratio of the screen in an unfolded state may be 8:9, and is close to 1:1.

It may be understood that in FIG. 5B, FIG. 5D, FIG. 6B, FIG. 6C, FIG. 7C, and FIG. 9B, descriptions are provided by using an example in which a size of a window in which a video is played in full screen mode (that is, a window in which a target object is displayed in full screen mode) is the same as or basically the same as a size of a display. In another embodiment, similar to FIG. 4A, the size of the window in which the video is played in full screen mode and that is shown in FIG. 5B, FIG. 5D, FIG. 6B, FIG. 6C, FIG. 7C, and FIG. 9B may alternatively be less than the size of the screen, and is greater than a size of the window in which the video is located, that is in a multi-window display status existing before full-screen video play, and that is shown in FIG. 1A, FIG. 3A, FIG. 3B, FIG. 5A, FIG. 5C, FIG. 6A, FIG. 6D, FIG. 8A, FIG. 8B, FIG. 7A, and FIG. 9A When playing the video in full screen mode on the entire screen, after detecting an operation that is of the user and that indicates to exit full-screen video play, the mobile terminal may exit a full-screen video play state, and restore a multi-window display status existing before full-screen video play.

For example, the operation that is of the user and that indicates to exit full-screen video play may be an operation that the user taps a full-screen exit control 402 shown in FIG. 4C, an operation that the user taps a back (back) control 403, or an operation that the user taps a back button 404.

In some embodiments, after detecting the operation that is of the user and that indicates to exit full-screen video play, the mobile terminal may restore, based on previously stored multi-window status information, a multi-window display status existing before full-screen video play, for example, restore statuses such as a window size, a window mode, and a window location of each of a plurality of windows. It should be noted that restoring a multi-window display status does not include restoring multi-window display content existing before full-screen video play. Display content in each window may change in real time. Multi-window display content obtained after full-screen video play exits may be the same as or may be different from the multi-window display content existing before full-screen video play.

For example, for a correspondence between a schematic diagram used to indicate a multi-window display status existing before full-screen video play interface display, a schematic diagram used to indicate a display status that is of a video play window and that is obtained during full-screen video play interface display, and a schematic diagram used to indicate a multi-window display status obtained after full-screen video play interface display exits, refer to Table 1.

TABLE 1

| Multi-window display status existing before full-screen video play | Display status obtained during full-screen video play | Multi-window display status obtained after full-screen video play exits |
|---|---|---|
| FIG. 1A, FIG. 3A, and FIG. 3B | FIG. 4B/FIG. 4C | FIG. 1A |
| FIG. 5A | FIG. 5B | FIG. 5A |
| FIG. 5C | FIG. 5D | FIG. 5C |
| FIG. 6A, FIG. 6D, FIG. 8A, and FIG. 8B | FIG. 6B/FIG. 6C | FIG. 6A, FIG. 6D, FIG. 8A, and FIG. 8B |
| FIG. 7A | FIG. 7C | FIG. 7A |
| FIG. 9A | FIG. 9B | FIG. 9A |

For example, in the scenario shown in FIG. 1A, after detecting the operation that is of the user and that indicates to play the video in full screen mode, the mobile terminal may display the interface shown in FIG. 4C. In the scenario shown in FIG. 4C, after detecting the operation that is of the user and that indicates to exit full-screen video play, the mobile terminal restores statuses such as a window size, a window mode, a window location, and a display direction shown in FIG. 1A. If the display direction is switched from the portrait direction to the landscape direction when the video is played in full screen mode on the entire screen, after exiting full-screen video play, the mobile terminal may further switch the display direction from the landscape direction back to the portrait direction.

Figure 12A:
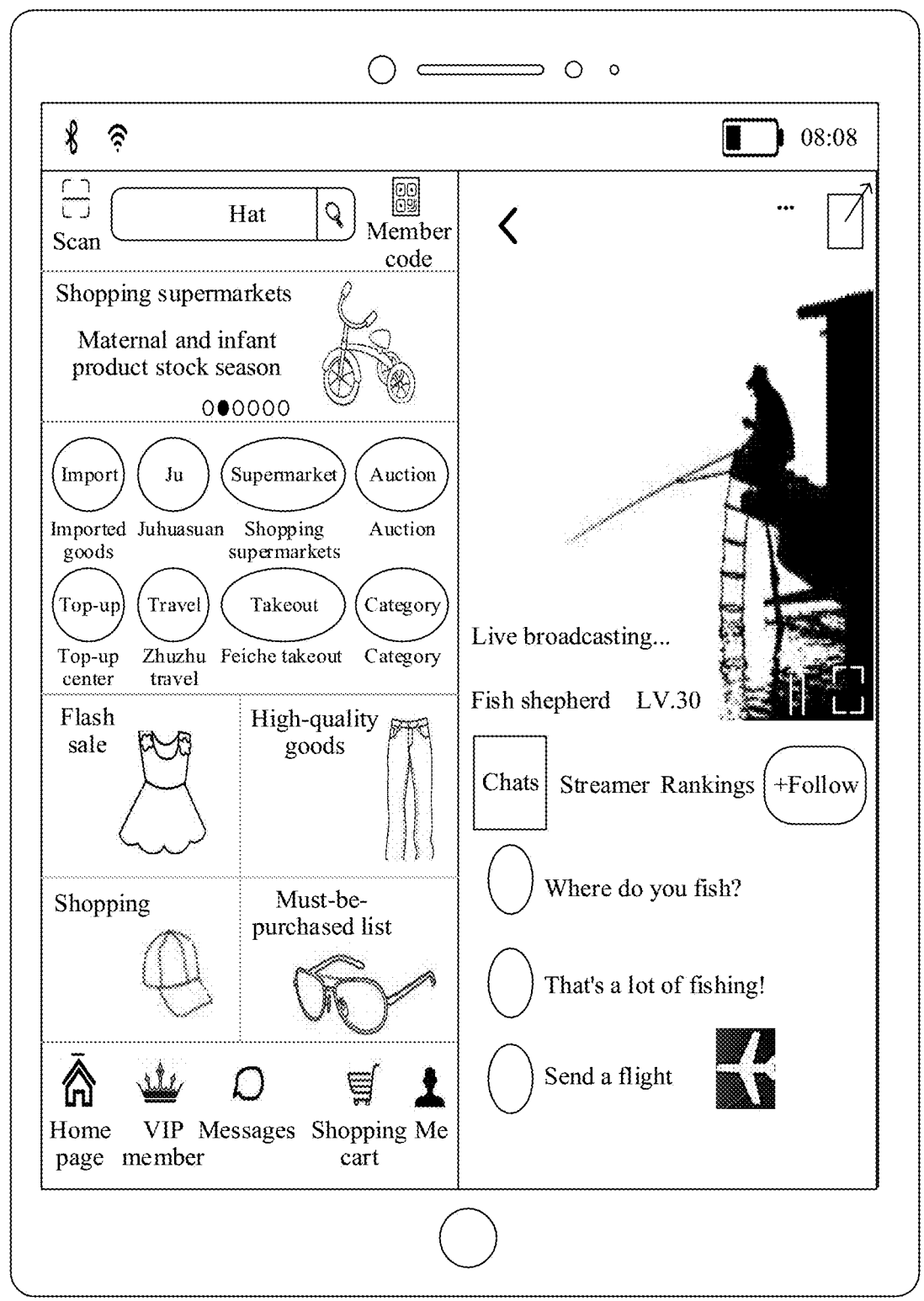
FIG. 12A is a diagram of another multi-window display interface according to an embodiment of this application.
Figure 12B:
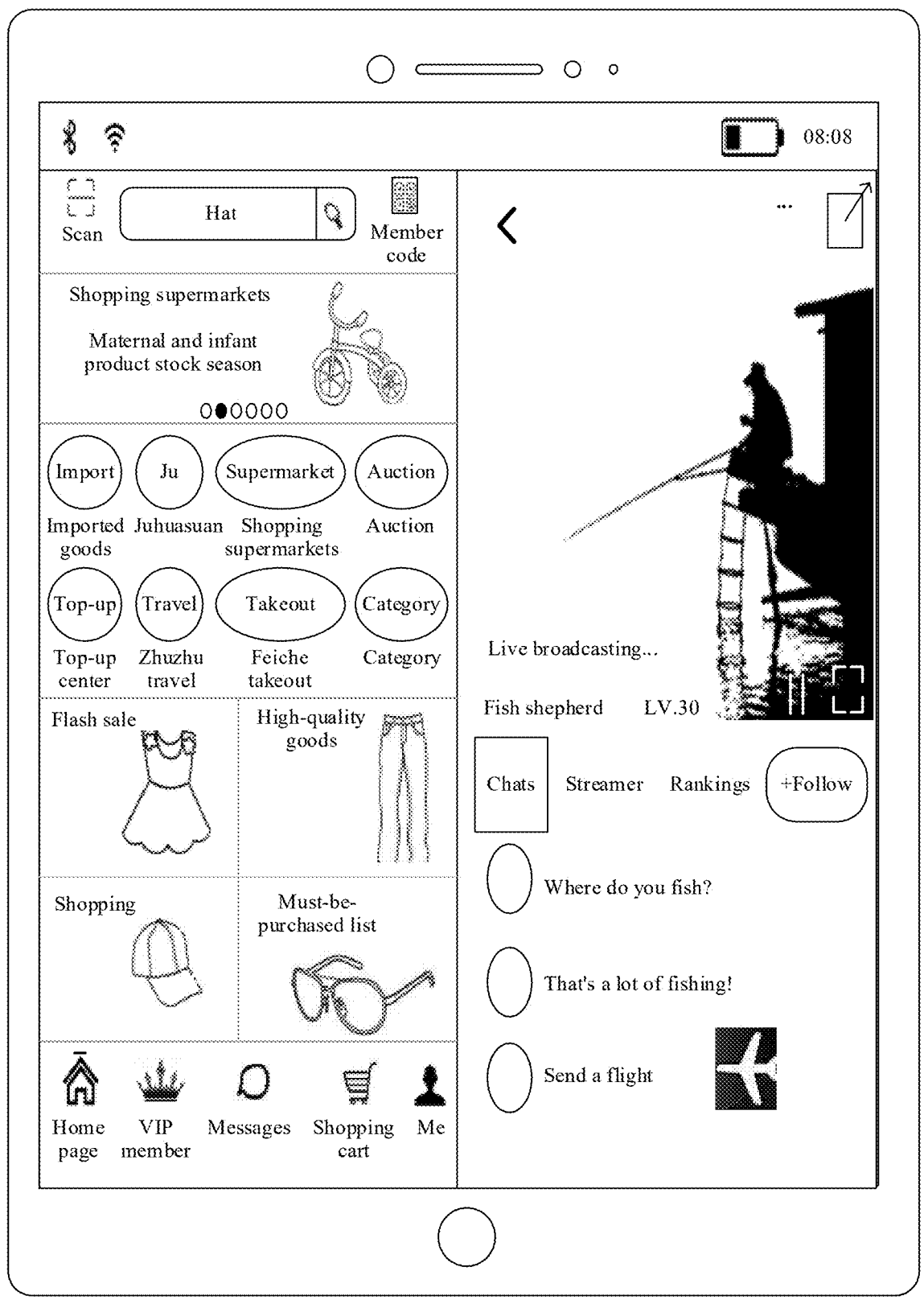
FIG. 12B is a diagram of another multi-window display interface according to an embodiment of this application.

For example, in the scenario shown in FIG. 12A, the display direction of the mobile terminal is a portrait direction. After detecting the operation that is of the user and that indicates to play the video in full screen mode, the mobile terminal may switch to a landscape direction, and display an interface shown in FIG. 6B. In the scenario shown in FIG. 6B, after detecting the operation that is of the user and that indicates to exit full-screen video play, the mobile terminal may display an interface shown in FIG. 12B. In FIG. 12B, after exiting full-screen display, the mobile terminal switches back to the portrait direction, and displays, in a landscape state in the portrait direction, a window corresponding to a Taobao application and a window corresponding to a live broadcast application. After the user flips the mobile terminal to a portrait state, as shown in FIG. 12A, the mobile terminal may display, in the portrait state in the portrait direction, the window corresponding to the Taobao application and the window corresponding to the live broadcast application.

In some other embodiments, after detecting the operation that is of the user and that indicates to exit full-screen video play, the mobile terminal may adaptively set locations and sizes of a plurality of windows based on a current landscape state or portrait state, so that a window display effect adapts to a current flipping state and holding manner that are used by the user for the mobile terminal, to improve use experience of the user.

Figure 12C:
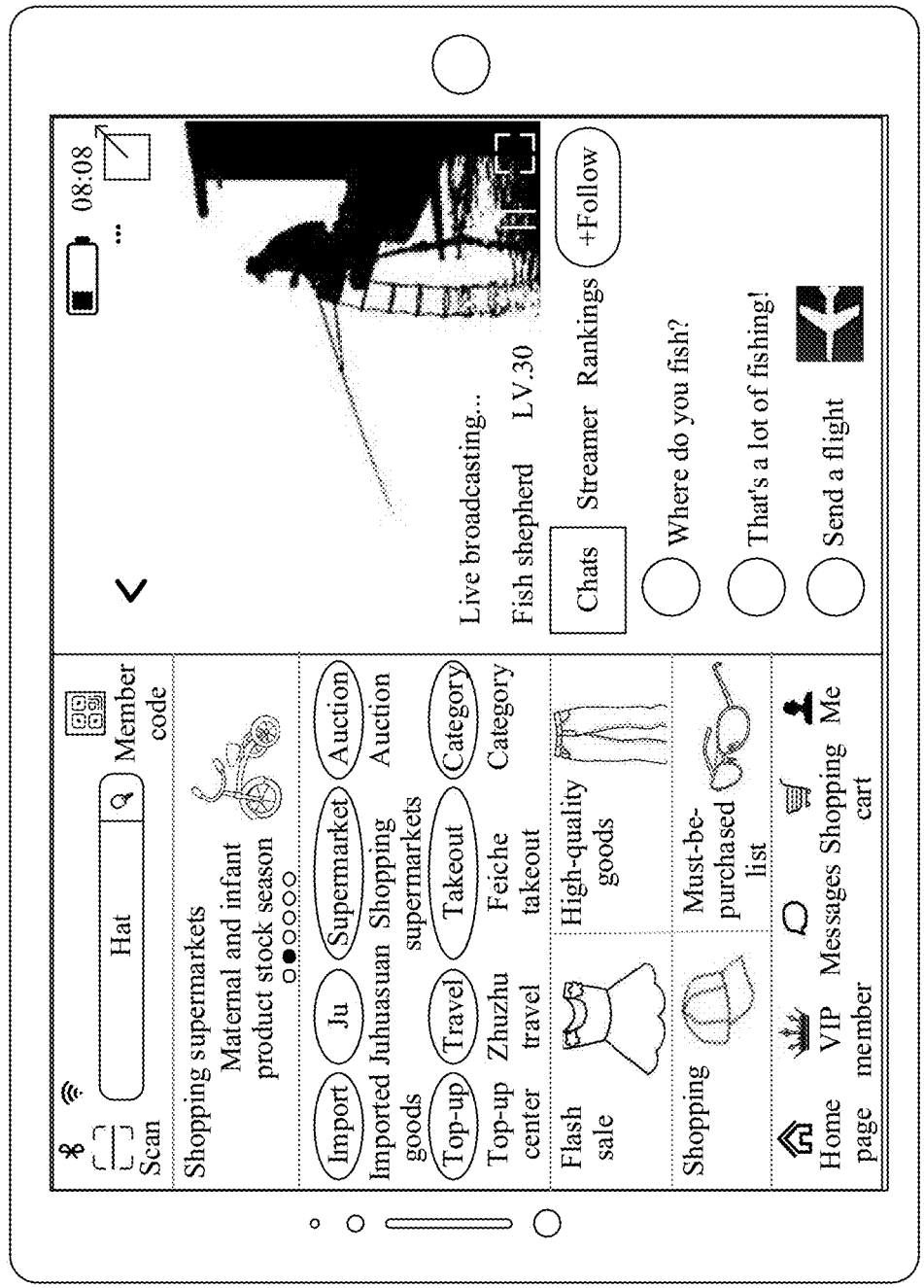
FIG. 12C is a diagram of another multi-window display interface according to an embodiment of this application.

For example, in the scenario shown in FIG. 12A, the display direction of the mobile terminal is a portrait direction. After detecting the operation that is of the user and that indicates to play the video in full screen mode, the mobile terminal may switch to a landscape direction, and display an interface shown in FIG. 6B. In the scenario shown in FIG. 6B, after detecting the operation that is of the user and that indicates to exit full-screen video play, the mobile terminal may display an interface shown in FIG. 12C. In FIG. 12C, after exiting full-screen display, the mobile terminal does not switch back to the portrait direction, but still displays, in the landscape state in the landscape direction, the window corresponding to the Taobao application and the window corresponding to the live broadcast application.

In some other embodiments, after detecting the operation that is of the user and that indicates to play the video in full screen mode, the mobile terminal may prompt, by displaying information, by using a voice, or the like, the user to determine whether to display a video play interface in full screen mode on the entire screen of the mobile terminal or display a video play interface in full screen mode in an application window of a partial area of the screen. The mobile terminal performs a corresponding full-screen display operation according to an instruction of the user.

Figure 13:
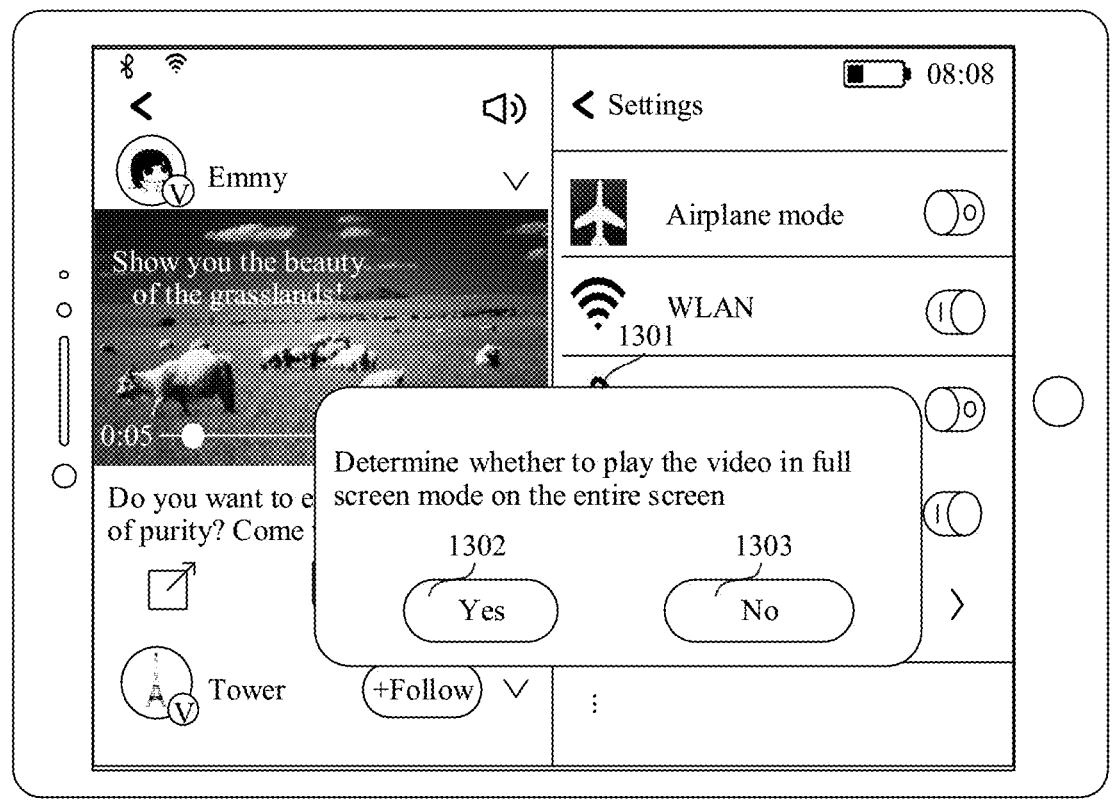
FIG. 13 is a schematic diagram of other prompt information according to an embodiment of this application.

For example, after the mobile terminal detects, in the scenario shown in FIG. 1A, the operation that is of the user and that indicates to play the video in full screen mode, as shown in FIG. 13, the mobile terminal may display a prompt box 1301, to prompt the user to determine whether to play the video in full screen mode on the entire screen. If the mobile terminal detects an operation of tapping a control 1302 by the user, as shown in FIG. 4B or FIG. 4C, the mobile terminal plays the video in full screen mode on the entire screen. If the mobile terminal detects an operation of tapping a control 1303 by the user, as shown in FIG. 1B, the mobile terminal plays the video in full screen mode in the window of the Weibo application.

Figure 14:
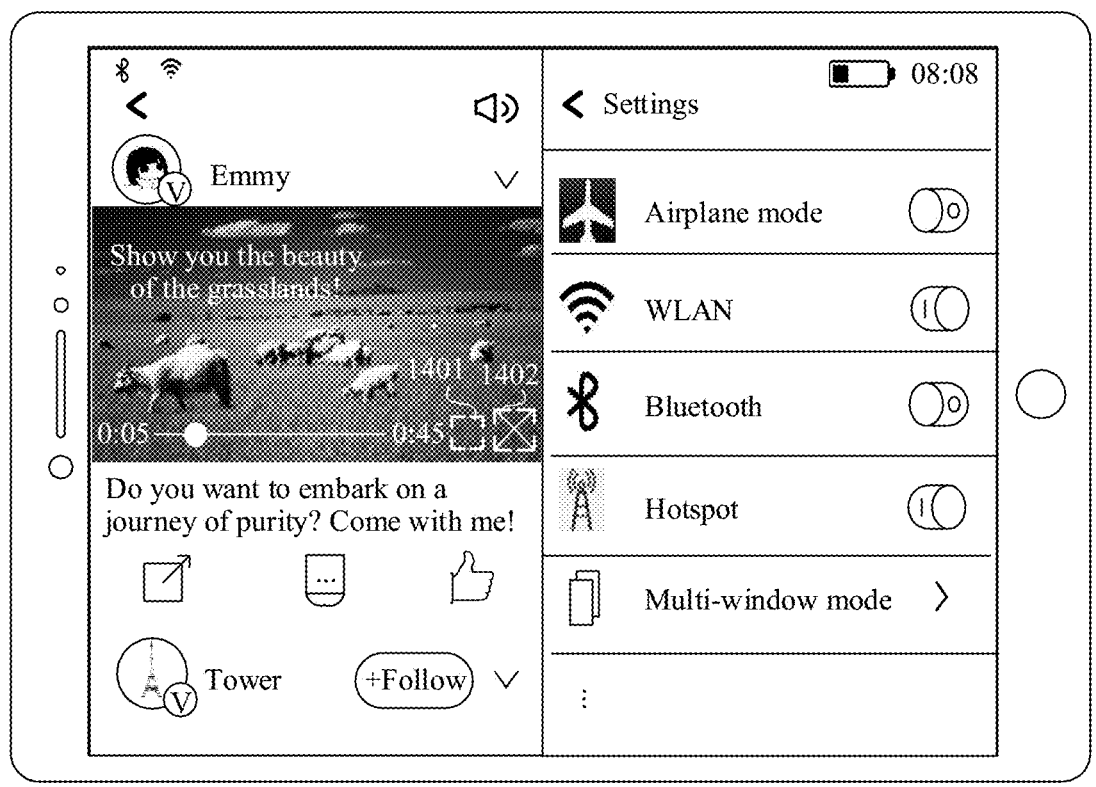
FIG. 14 is a schematic diagram of a group of full-screen play controls according to an embodiment of this application.

In some other embodiments, as shown in FIG. 14, the video play interface includes a full-screen play control 1401 and a full-screen play control 1402. After detecting an operation of tapping the control 1402 by the user, as shown in FIG. 4B or FIG. 4C, the mobile terminal displays the video play interface in full screen mode on the entire screen by using the method provided in this embodiment of this application, where a size of a video picture matches a size of the entire screen. After detecting an operation of tapping the control 1401 by the user, as shown in FIG. 1B, the mobile terminal displays the video play interface in full screen mode in an application window in which the video is located, where a size of a video picture matches a size of the window 01 of the Weibo application.

In some other embodiments, after detecting a preset first voice or a preset first gesture, the mobile terminal displays the video play interface in full screen mode on the entire screen of the mobile terminal by using the method provided in this embodiment of this application, where a size of a video picture matches a size of the entire screen. After detecting a preset second voice or a preset second gesture, the mobile terminal displays the video play interface in full screen mode in an application window of a partial area of the screen, where a size of a video picture matches a size of the application window of the partial area.

In some other embodiments, mutual switching may be performed between a device-level full-screen display mode and an intra-window full-screen display mode. For example, in the device-level full-screen display mode shown in FIG. 4B, the interface displayed by the mobile terminal includes a full-screen mode switching control. After detecting an operation of tapping the full-screen mode switching control by the user, the mobile terminal switches to the intra-window full-screen display mode shown in FIG. 1B. For another example, after detecting a pinch closed operation performed by the user in the interface shown in FIG. 4B, the mobile terminal switches to the intra-window full-screen display mode shown in FIG. 1B. For another example, in the intra-window full-screen display mode shown in FIG. 1B, if the mobile terminal detects an instruction that is of the user and that instructs, by using a voice, to switch the full-screen display mode, the mobile terminal switches to the device-level full-screen display mode shown in FIG. 4B.

Descriptions are provided above by using an example in which the mobile terminal displays the video play interface in full screen mode in a scenario in which the video is played in full screen mode. In another application scenario, the target object may be displayed on the entire screen of the mobile terminal by using the full-screen display method provided in the foregoing embodiments of this application.

For example, in a multi-window scenario, a window includes a picture. In response to an instruction operation of the user, the mobile terminal may display the picture in full screen mode on an entire screen, to improve immersive experience of browsing the picture by the user. The picture may be a picture in Gallery, a picture in a browser, a picture in WeChat Moments, another picture, or the like.

Figure 15A:
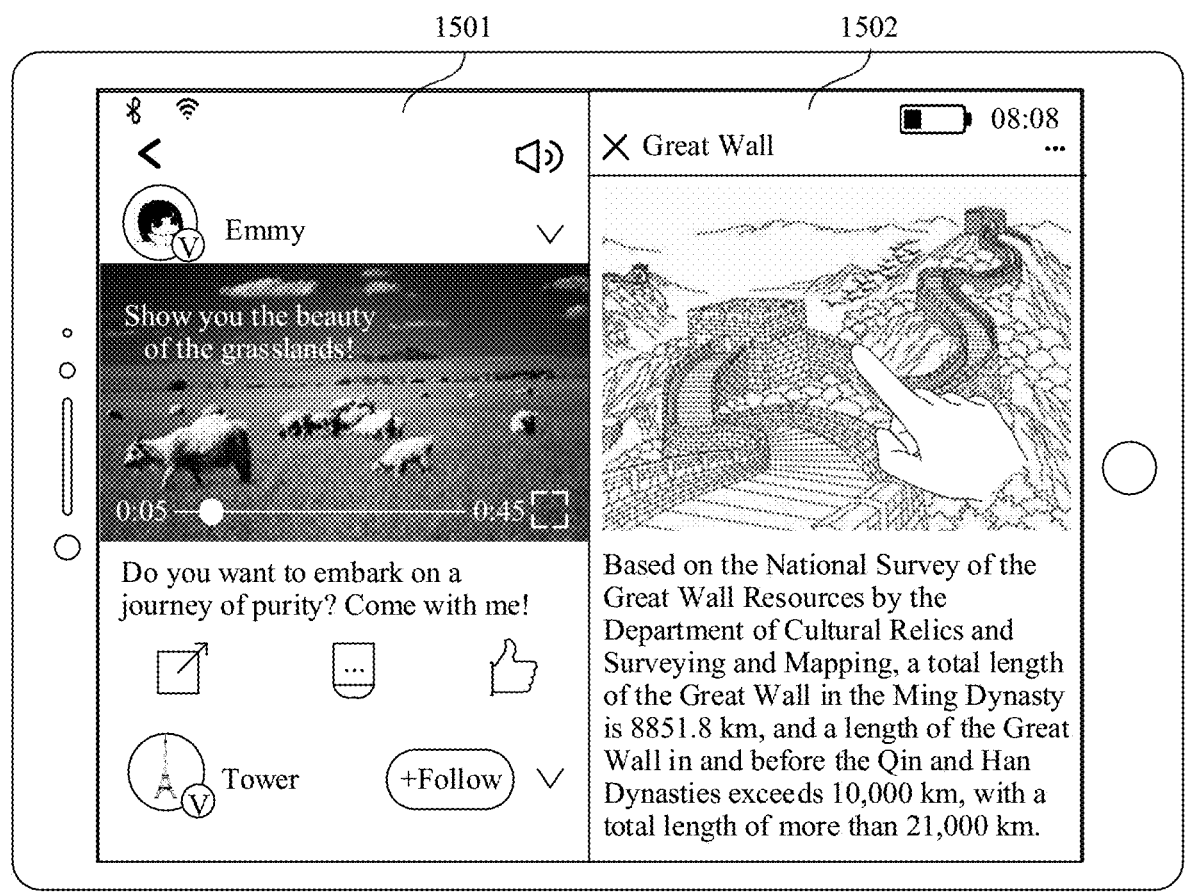
FIG. 15A is a diagram of another multi-window display interface according to an embodiment of this application.
Figure 15B:
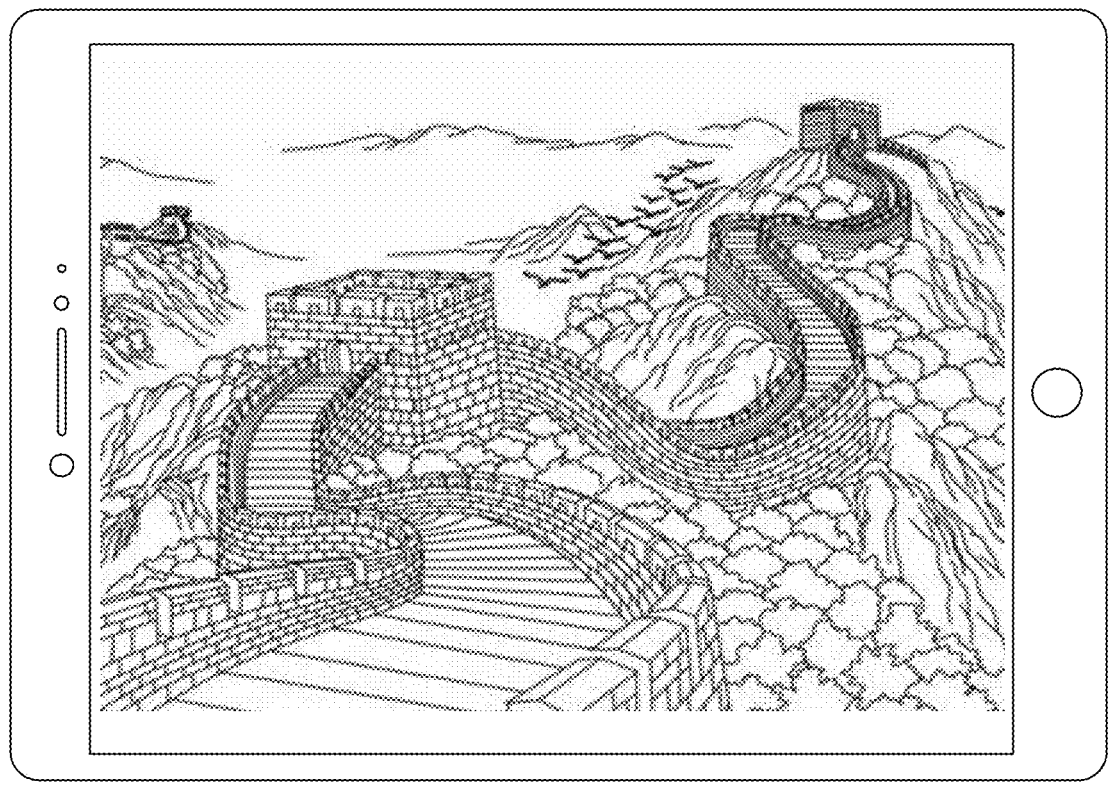
FIG. 15B is a diagram of another full-screen display interface according to an embodiment of this application.

For example, as shown in FIG. 15A, in a multi-window scenario, a window 1501 corresponding to a Weibo application and a window 1502 corresponding to a browser application are included. After detecting a tapping operation performed by the user on a picture in the window 1502, as shown in FIG. 15B, the mobile terminal displays the picture in full screen mode on the entire screen.

For another example, in a multi-window scenario, a window is a window of a reader application. In response to an instruction operation of the user, the mobile terminal may display a reader interface in full screen mode on an entire screen, to improve immersive experience of reading an e-book by the user.

Figure 16A:
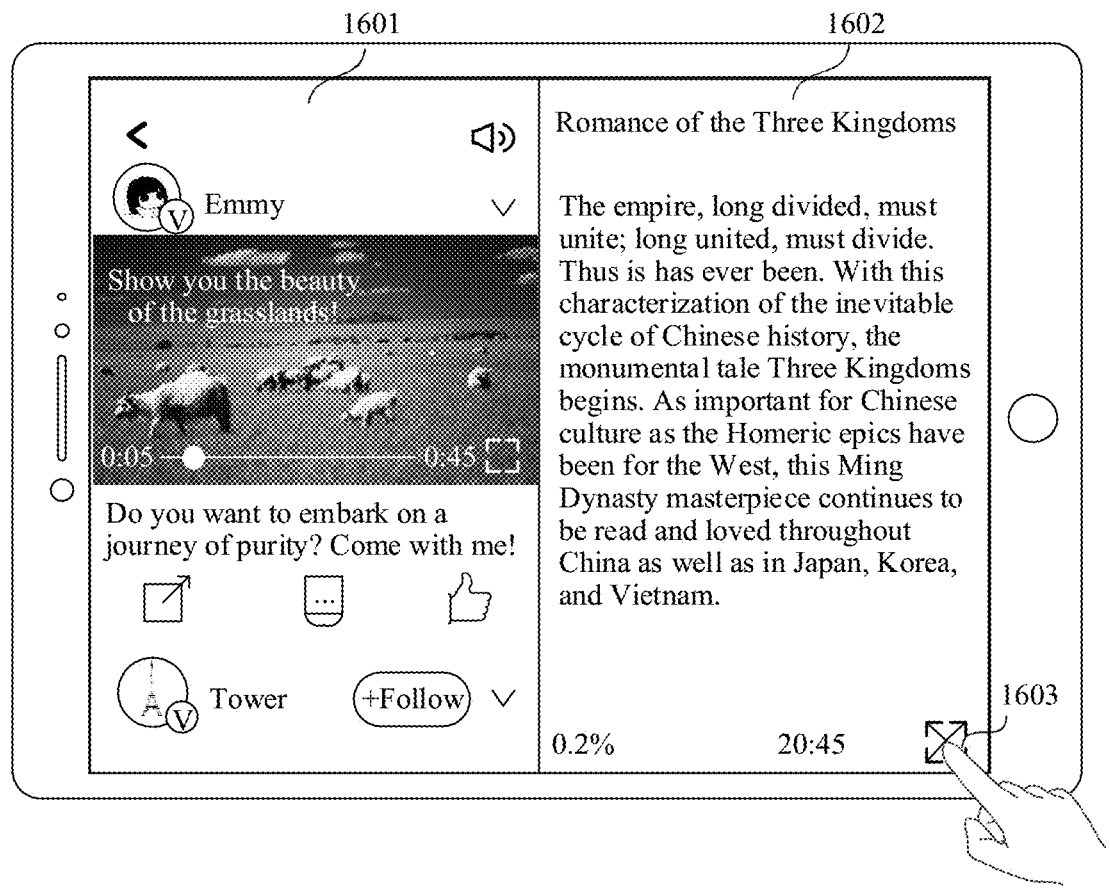
FIG. 16A is a diagram of another multi-window display interface according to an embodiment of this application.

For example, as shown in FIG. 16A, in a multi-window scenario, a window 1601 corresponding to a Weibo application and a window 1602 corresponding to a reader application are included. After detecting an operation of tapping a control 1603 by the user, as shown in FIG. 16B, the mobile terminal displays text content of the reader in full screen mode on the entire screen.

For another example, in a multi-window scenario, a window is a window of a game application. In response to an instruction operation of the user, the mobile terminal may display a game interface in full screen mode on an entire screen, so that the user can be better immersed in a game.

A software system of the mobile terminal may use a layered architecture, an event-driven architecture, a micro-kernel architecture, a microservice architecture, or a cloud architecture. In this embodiment of this application, an Android (Android) system with the layered architecture is used as an example to describe a software structure of the mobile terminal.

Figure 17A:
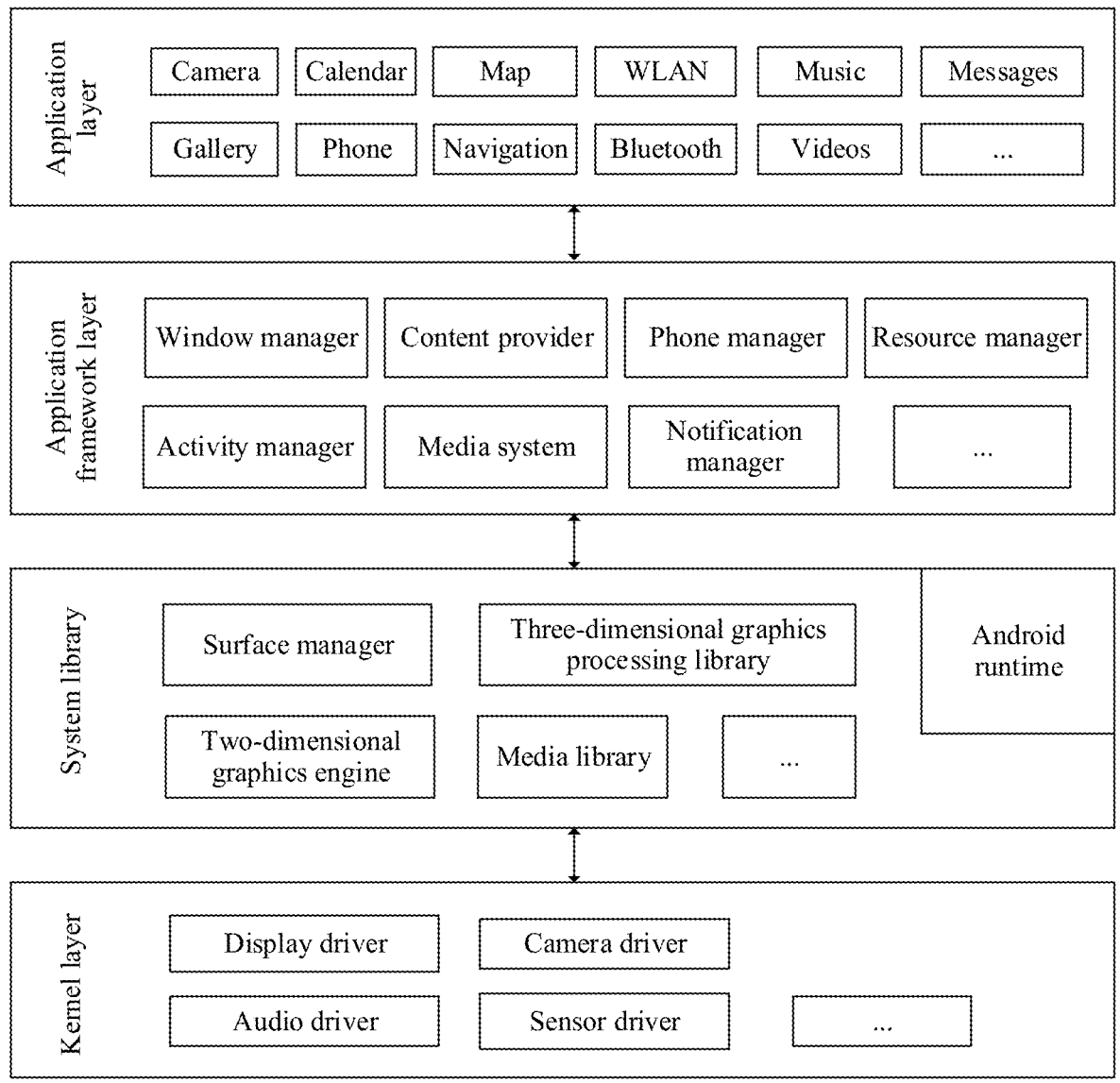
FIG. 17A is a schematic diagram of a software architecture according to an embodiment of this application.

FIG. 17A is a block diagram of a software structure of a mobile terminal according to an embodiment of this application. In a layered architecture, software is divided into several layers, and each layer has a clear role and task. The layers communicate with each other through a software interface. In some embodiments, an Android system is divided into four layers, that is, an application layer, an application framework layer, an Android runtime (Android runtime) and system library, and a kernel layer from top to bottom. The application layer may include a series of application packages.

As shown in FIG. 17A, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 17A, the application framework layer may include an activity manager (Activity Manager), a window manager (Window Manager), a media system (Media System), a content provider, a view system, a phone manager, a resource manager, a notification manager, and the like.

The activity manager is configured to be responsible for managing activity-related transactions such as start, a status, and a lifecycle of an activity (activity) of an application. The activity is an application component, and may provide a screen, so that a user interacts with the mobile terminal through the screen, to complete a task.

The window manager is configured to manage a window program. The window manager may obtain a size of a display, manage a size, display, and motion of a window, and determine whether there is a status bar, perform screen locking, take a screenshot, and the like.

The media system is configured to manage media information of an application.

The content provider is configured to: store and obtain data, and make the data accessible to an application. The data may include a video, an image, an audio, calls that are made and received, a browsing history and bookmarks, an address book, and the like.

The view system includes visual controls, such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the mobile terminal, for example, management of a call status (including answering or declining).

The resource manager provides, for an application, various resources such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to notify download completion, provide a message notification, and the like. The notification manager may alternatively be a notification that appears in the status bar at the top of the system in a form of a graph or a scroll bar text, for example, a notification of an application running on the background or a notification that appears on the screen in a form of a dialog window. For example, text information is displayed in the status bar, an alert tone is played, the mobile terminal vibrates, and the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of audio and videos in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver. The display driver may be configured to: drive a display, control a drive current, and the like.

A scenario in which a video is played in full screen mode is used as an example below to describe a software working procedure of the mobile terminal in this embodiment of this application.

For example, in the multi-window scenario shown in FIG. 1A or FIG. 3A, the display of the mobile terminal includes the window corresponding to the Weibo application and the window corresponding to the setting application. After detecting the operation that is of the user and that indicates to play the video in full screen mode, the mobile terminal displays the video play interface in full screen mode on the entire display.

Specifically, the touch sensor may detect a touch operation. After the touch sensor detects the operation that is of the user and that indicates to play the video in full screen mode, an application at the application layer corresponding to the window in which the video is located notifies the application framework layer. After determining that the video is played in full screen mode, the application framework layer draws a window whose size is the same as a size of the display, and provides window drawing data to the display driver at the kernel layer. The display driver controls, based on the window drawing data, the display to display a corresponding window, and displays video content in the window, to implement device-level full-screen video play.

When the touch sensor receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. The touch operation is a touch tap operation, and a control corresponding to the tap operation is a full-screen play control in a window of a Weibo application. The window of the Weibo application is a focus window, and the Weibo application is a focus application.

Figure 17B:
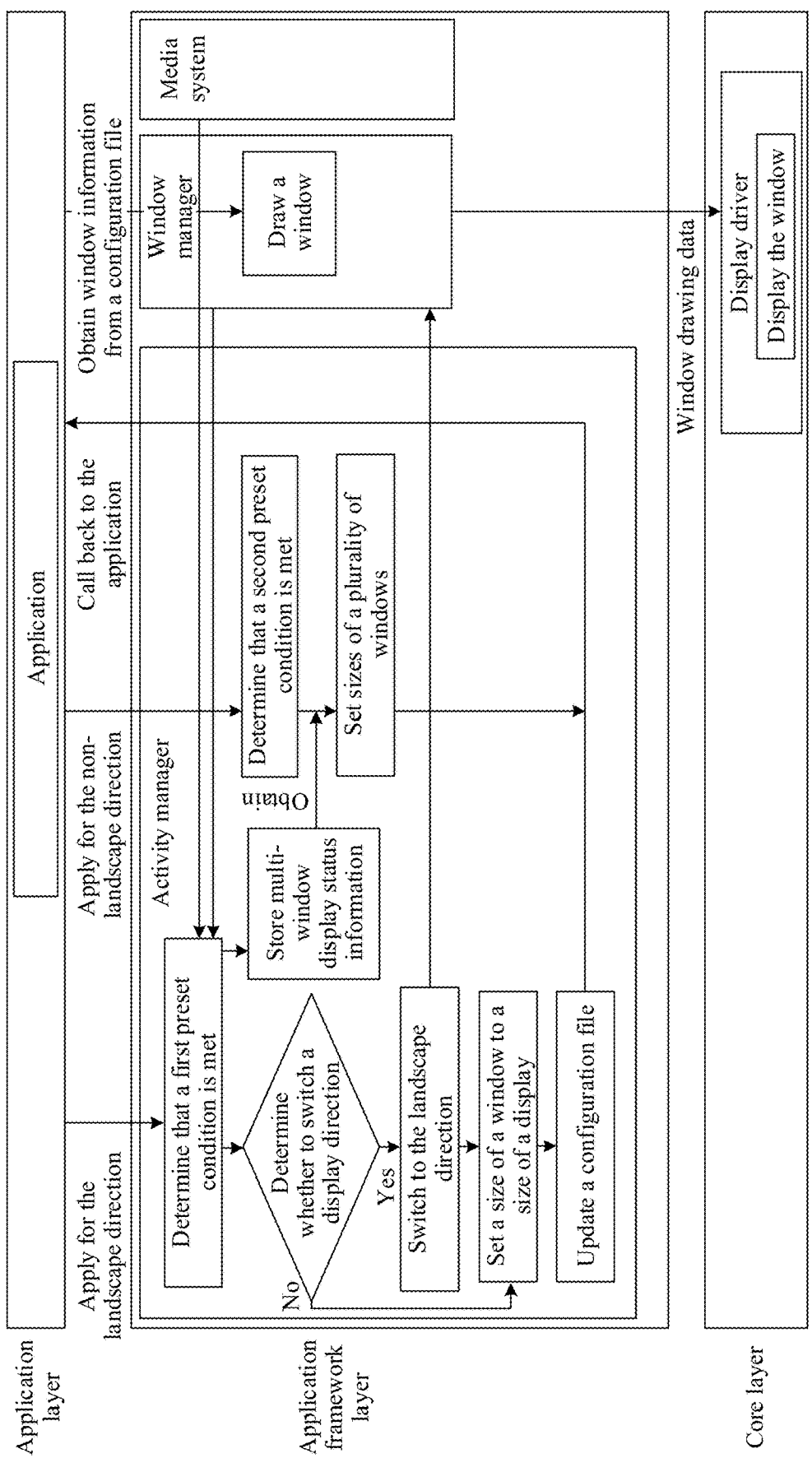
FIG. 17B is a flowchart of a display method according to an embodiment of this application.

As shown in FIG. 17B, an application (that is, a focus application) may call the function setRequestOrientation, and apply for a display direction of a landscape direction. The activity manager first determines whether a first preset condition is met. If the first preset condition is met, the activity manager further determines whether to switch the display direction. If the first preset condition is not met, the activity manager does not perform processing.

In some embodiments, the first preset condition may include: determining whether an application or a system requests to apply for a landscape direction. If the application requests to apply for the landscape direction, the application is a focus application corresponding to a focus window, and is not currently in a full-screen video play state (that is, a video is not currently played in full screen mode on the entire display).

In addition, it should be noted that, when the mobile terminal switches from a portrait state to a landscape state because the user flips the mobile terminal, a sensor such as a gyro may detect a posture change of the mobile terminal, and report the posture change to the system. The system may call the function setRequestOrientation, and apply for a display direction of a landscape direction.

In some other embodiments, because an audio and video decoder is in a working state when a video is played, the first preset condition may further include that the Weibo application is invoking the audio and video decoder, and the activity manager determines, based on media information that is of the Weibo application and that is obtained from the media system, that the audio and video decoder is in the working state. In this way, the activity manager may more accurately determine, based on the first preset condition, that full-screen video play needs to be triggered.

In addition, when the target object is a game interface, if the activity manager determines that an application that requests to apply for a display direction is a focus application corresponding to a focus window, the display direction for which the focus application applies is a landscape direction, the application is not currently in a full-screen video play state, and a video decoder is in a working state, the activity manager may more accurately determine that full-screen video play needs to be triggered.

A plurality of apps on the mobile terminal can play audio. The operating system provides an API for enabling apps to share an audio focus (audio focus). At a same moment, only one app can obtain and hold an audio focus. When an app needs to output audio, the app needs to request the audio focus. The app can play audio only after the audio focus is authorized to the app. To be specific, only the application that obtains the audio focus can play audio. Therefore, in some other embodiments, the first preset condition may further include that the Weibo application obtains the audio focus, and the activity manager determines, based on the media information that is of the Weibo application and that is obtained from the media system, that the Weibo application obtains the audio focus, so that the activity manager can more accurately determine, based on the first preset condition, that full-screen video play needs to be triggered.

In some other embodiments, because most video play windows are of a SurfaceView type currently, the first preset condition may further include that the activity manager includes a subwindow of a SurfaceView type based on a window in which a full-screen play control is located and that is obtained from the window manager, where the subwindow may be a video play window, so that the activity manager can more accurately determine, based on the first preset condition, that full-screen video play needs to be triggered.

As shown in FIG. 17B, after determining that the video can be played in full screen mode, the activity manager stores current multi-window status information, so that after exiting full-screen video play, the activity manager may restore a multi-window display status based on the multi-window status information.

As shown in FIG. 17B, after determining that the video can be played in full screen mode on the entire display, the activity manager determines whether to switch the display direction. It can be learned from the foregoing descriptions that the activity manager may determine, according to a preset policy, a preset setting of the user, or a current instruction of the user, whether to switch the display direction. Details are not described herein. If the activity manager determines that the display direction needs to be switched, the activity manager may switch a portrait direction to a landscape direction, and store direction switching information. The direction switching information is used to indicate that the display direction is switched from the portrait direction to the landscape direction.

As shown in FIG. 17B, the activity manager may respectively set values of the width and the height of the focus window (that is, the window of the Weibo application) to values of the width and the height of the display, so that a size of the focus window is the same as a size of the display. In some cases, the activity manager may further set a window mode (Window Mode) of the focus window to a full screen (full screen) mode, that is, set a window mode of the focus application corresponding to the focus window to a full screen mode. Therefore, the video play interface in the window of the Weibo application is displayed in full screen mode on the entire display.

For example, in a free multi-application multi-window scenario, the mobile terminal displays a plurality of windows in a free mode (free mode). The window mode of the focus window is a free mode and does not need to be switched to a full screen (full screen) mode. The activity manager may respectively set values of the width and the height of the focus window to values of the width and the height of the display.

For another example, in a single-application multi-window scenario, a plurality of windows are displayed in full-screen mode. The window mode of the focus window does not need to be switched to a full-screen mode. The activity manager may respectively set values of the width and the height of the focus window to values of the width and the height of the display.

For another example, in a split-screen multi-application multi-window scenario, the mobile terminal displays a plurality of windows in split-screen mode. The window mode of the focus window is a split-screen mode. The activity manager may switch the split-screen mode to a full-screen mode. After the split-screen mode is switched to the full-screen mode, the activity manager may further respectively set values of the width and the height of the focus window to values of the width and the height of the display.

After respectively setting the values of the width and the height of the focus window (that is, the window of the Weibo application) to the values of the width and the height of the display, or setting the split-screen mode to the full-screen mode, the activity manager may update status information such as information about the width and the height of the focus window and the window mode of the focus window in a configuration (Configuration) file of the focus application, so that the window information is called back to the focus application by using the configuration file.

As shown in FIG. 17B, the window manager may invoke the interface onConfigurationChanged, obtain updated information about the width and the height of the focus window from the configuration file of the focus application, and draw, based on the updated information about the width and the height of the focus window, a window whose size is the same as a size of the display. The window manager provides window drawing data to the display driver.

As shown in FIG. 17B, the display driver drives, based on the window drawing data, the display to display the window whose size is the same as the size of the display. In addition, the display may further obtain video data from a video file, to display video content in the window whose size is the same as the size of the display, so as to implement device-level full-screen video play.

After detecting the operation that is of the user and that indicates to exit full-screen video play, the mobile terminal exits device-level full-screen video play, and restores a multi-window display status existing before full-screen video play.

Specifically, when the touch sensor receives a touch operation, a corresponding hardware interruption is sent to the kernel layer. The kernel layer processes the touch operation into an original input event. The original input event is stored at the kernel layer. The application framework layer obtains the original input event from the kernel layer, and identifies a control corresponding to the input event. The touch operation is a touch tap operation, and a control corresponding to the tap operation is a back button disposed on the mobile terminal, a full-screen exit control or a back (back) control disposed on the video play interface, or the like.

As shown in FIG. 17B, an application (that is, a focus application) calls setRequestOrientation, and applies for a display direction of a non-landscape direction. If the activity manager determines that a second preset condition is met, the activity manager exits full-screen video play. The second preset condition includes that the application is currently in a full-screen video play state, that is, a video play interface is displayed on the entire display, and the activity manager determines, based on previously stored multi-window status information, that a previous historical state is a multi-window state.

As shown in FIG. 17B, the activity manager sets values of the width and the height of each window and a window mode of each window in the previously stored multi-window status information to values of the width and the height of each current window and a window mode of each current window. In addition, the activity manager updates, based on the multi-window status information, values of the width and the height of the window, the window mode of the window, and the like in configuration files of applications respectively corresponding to a plurality of windows. After determining, based on the previously stored direction switching information, that the display direction is switched from the portrait direction to the landscape direction, the activity manager may further switch back to the portrait direction.

As shown in FIG. 17B, the window manager may invoke the interface onConfigurationChanged, obtain updated related information of the window from the configuration file, draw, based on the updated related information of the window, windows respectively corresponding to the Weibo application and the setting application, and provide window drawing data to the display driver.

As shown in FIG. 17B, the display driver drives, based on the window drawing data, the display to display a plurality of windows, and restores a multi-window display status existing before full-screen video play. The display may further obtain content data of the application from a video file, and display corresponding content in each window based on the content data of the application. Therefore, the mobile terminal exits device-level full-screen video play.

Figure 18:
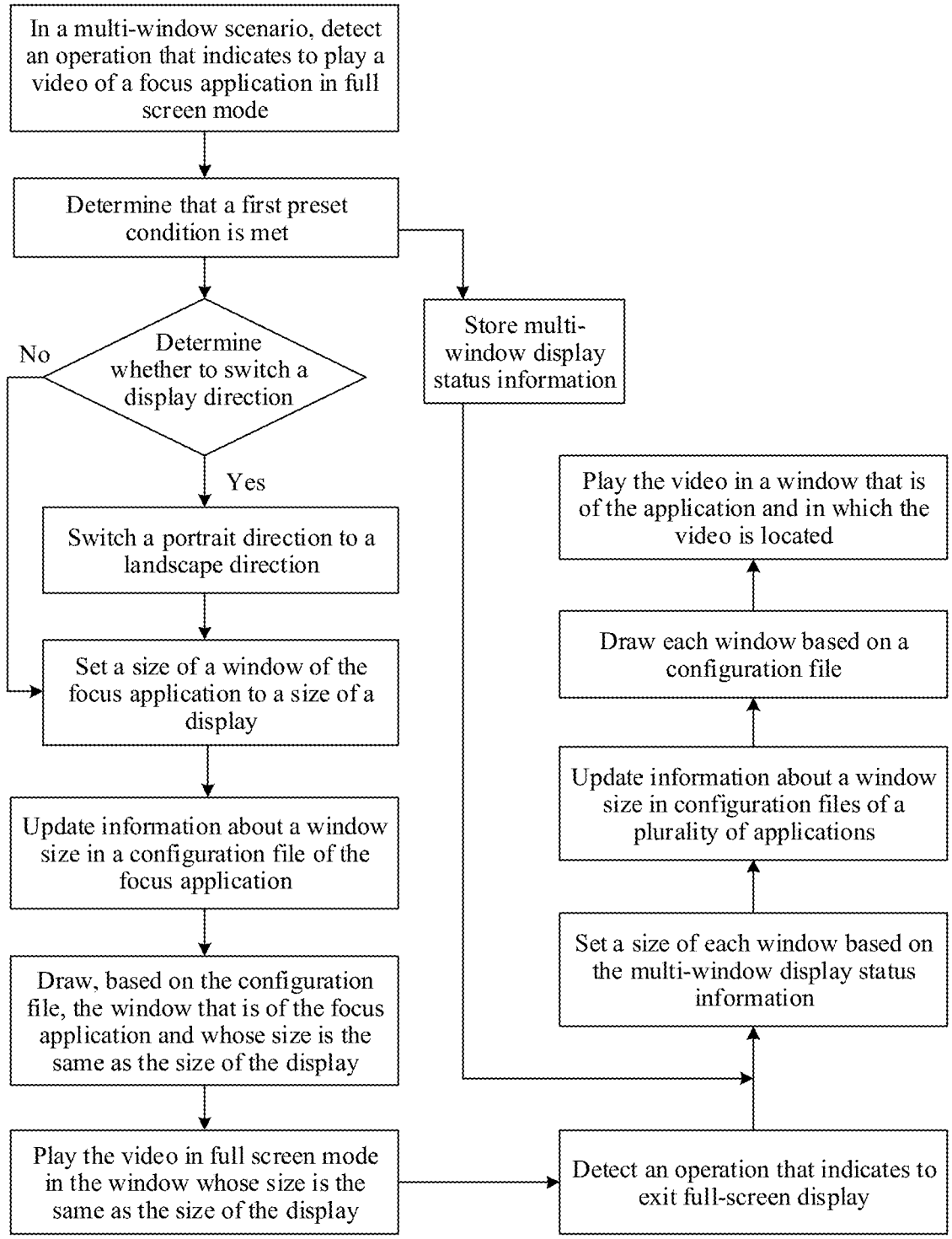
FIG. 18 is a flowchart of another display method according to an embodiment of this application.

In addition, FIG. 17B mainly describes, from a perspective of software, a related procedure of the full-screen display method provided in the embodiments of this application. FIG. 18 provides another schematic diagram, and mainly describes, from a perspective of a mobile terminal, a related procedure of the full-screen display method provided in the foregoing embodiments of this application.

An embodiment of this application further provides a mobile terminal. The mobile terminal may include a display unit, a detection unit, a switching unit, an obtaining unit, and the like. These units may perform the steps in the foregoing embodiments to implement the device-level full-screen display method.

An embodiment of this application further provides a mobile terminal, including one or more processors, a memory, a display, and one or more computer programs. The one or more computer programs are stored in the memory, and the one or more computer programs include instructions. When the instructions are executed by the one or more processors, the mobile terminal is enabled to perform the steps in the foregoing embodiments, to implement the device-level full-screen display method.

For example, when the mobile terminal is the device shown in FIG. 2, the processor in the mobile terminal may be the processor 110 in FIG. 2, the memory in the mobile terminal may be the internal memory 121 in FIG. 2, and the display in the mobile terminal may be the display 194 in FIG. 2.

An embodiment of this application further provides a computer storage medium. The computer storage medium stores computer instructions, and when the computer instructions are run on a mobile terminal, the mobile terminal is enabled to perform the foregoing related method steps to implement the device-level full-screen display method in the foregoing embodiments.

An embodiment of this application further provides a computer program product. When the computer program product runs on a computer, the computer is enabled to perform the foregoing related method steps to implement the device-level full-screen display method in the foregoing embodiments.

In addition, an embodiment of this application further provides an apparatus. The apparatus may be specifically a chip. The chip may include a processor and a memory. The memory stores instructions. When the instructions are executed by the processor, the chip is enabled to perform the foregoing related steps to implement the device-level full-screen display method in the foregoing embodiments.

In addition, an embodiment of this application further provides an apparatus. The apparatus may be specifically a component or a module. The apparatus may include a processor and a memory that are connected. The memory is configured to store computer executable instructions, and when the apparatus runs, the processor may execute the computer executable instructions stored in the memory, so that the apparatus performs the device-level full-screen display method in the foregoing method embodiments.

The mobile terminal, the computer storage medium, the computer program product, and the chip provided in the embodiments of this application each are configured to perform the corresponding method provided above. Therefore, for beneficial effects that can be achieved by the mobile terminal, the computer storage medium, the computer program product, and the chip, refer to the beneficial effects in the corresponding method provided above. Details are not described herein again.

Based on the foregoing descriptions of the implementations, a person skilled in the art may understand that for the purpose of convenient and brief descriptions, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division in an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may be one or more physical units, that is, may be located in one place, or may be distributed on a plurality of different places. Some or all of the units may be selected based on an actual requirement to achieve an objective of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A full-screen display method for a mobile terminal, wherein the mobile terminal comprises a display, and the method comprises:
displaying, by the mobile terminal, a first interface in a portrait orientation, wherein the first interface comprises a first window and a second window, the first window and the second window are used to display different user interfaces of an application, the first window and the second window have the same size and do not overlap, and the first window comprises a target object, wherein the target object is a video, and the video is played in a video play area of the first window;
detecting, by the mobile terminal, a first touch operation in the video play area, wherein the first touch operation indicates the mobile terminal to display the video in full screen mode;
displaying, by the mobile terminal, a second interface in a landscape orientation in response to the first touch operation, wherein the second interface comprises a third window, the third window displays the video in full screen mode, and the third window is larger than the first window; and
detecting, by the mobile terminal, an instruction for exiting full-screen display;
switching, by the mobile terminal, the display orientation back to the portrait orientation; and displaying, by the mobile terminal, a third interface in the portrait orientation, wherein the third interface comprises the first window and the second window, and sizes of the first window and the second window in the third interface are the same as sizes of the first window and the second window in the first interface.

2. The method according to claim 1, wherein before the displaying in the landscape orientation, the method further comprises:
obtaining, by the mobile terminal, a display orientation, wherein the display orientation comprises the landscape orientation or the portrait orientation; and
the displaying in the landscape orientation comprises:
in response to the display orientation obtained by the mobile terminal being the portrait orientation, and a difference between a width and a height of the display being greater than a preset value, switching, by the mobile terminal, the display orientation from the portrait orientation to the landscape orientation.

3. The method according to claim 1, wherein before the displaying in the landscape orientation, the method further comprises:
obtaining, by the mobile terminal, a display orientation, wherein the display orientation comprises the landscape orientation or the portrait orientation; and the displaying in the landscape orientation comprises:
in response to the display direction obtained by the mobile terminal being the portrait orientation, and the difference between the width and the height of the display being less than or equal to the preset value, displaying, by the mobile terminal, the second interface.

4. The method according to claim 3, wherein after displaying in the landscape orientation, the method further comprises:
storing, by the mobile terminal, orientation switching information, wherein the orientation switching information indicates that the display orientation is switched from the portrait orientation to the landscape orientation; and
after the displaying, by the mobile terminal, the second interface, the method further comprises:
when detecting, by the mobile terminal, an instruction for exiting full-screen display, the method further comprises:
switching, by the mobile terminal, the display orientation back to the portrait orientation based on the orientation switching information; and
displaying, by the mobile terminal, the third interface.

5. The method according to claim 4, wherein the mobile terminal comprises an activity manager and a window manager; and the displaying, by the mobile terminal, the second interface, wherein the second interface comprises the third window, the third window displays the video in full screen mode, and the third window is larger than the first window comprises:
updating, by the activity manager, first status information of the first window, wherein the first status information comprises a window size of the first window, and an updated window size of the first window is greater than a size of the first window in the first interface;
updating, by the activity manager, updated first status information to a configuration file of an application corresponding to the first window;
drawing, by the window manager, the third window based on the updated first status information in the configuration file; and
displaying, by the display, the third window, wherein the third window is used to display the video in full screen mode.

6. The method according to claim 5, wherein the first interface displays the first window and the second window in split-screen mode; and before the drawing, by the window manager, the third window, the method further comprises:
switching, by the activity manager, a split-screen mode to a full-screen mode; and
the drawing, by the window manager, the third window based on the updated first status information in the configuration file comprises:
drawing, by the window manager, the third window based on the updated first status information in the configuration file and the full-screen mode.

7. The method according to claim 4, wherein the mobile terminal comprises an activity manager and a window manager; and after the detecting, by the mobile terminal, the first touch operation, the method further comprises:
storing, by the activity manager, second status information of the first window and second status information of the second window, wherein the second status information comprises a window size and a window mode; and
the displaying, by the mobile terminal, the third interface, wherein the third interface comprises the first window and the second window, and sizes of the first window and the second window in the third interface are the same as sizes of the first window and the second window in the first interface comprises:
  updating, by the activity manager, the stored second status information of the first window to a configuration file of an application corresponding to the first window;
  drawing, by the window manager, the first window in the third interface based on the second status information of the first window in the configuration file;
  displaying, by the display, the first window in the third interface, wherein a size of the first window in the third interface is the same as a size of the first window in the first interface;
  updating, by the activity manager, the stored second status information of the second window to a configuration file of an application corresponding to the second window;
  drawing, by the window manager, the second window in the third interface based on the second status information of the second window in the configuration file; and
  displaying, by the display, the second window in the third interface, wherein a size of the second window in the third interface is the same as a size of the second window in the first interface.

8. The method according to claim 1, wherein before the displaying, by the mobile terminal, the second interface, the method further comprises: determining, by the mobile terminal, that one or more of the following are met: an audio and video decoder is in a working state; the mobile terminal is currently configured to play audio from an application corresponding to the first window in which the video is located; or the first window comprises a subwindow of a SurfaceView type.

9. The method according to claim 8, wherein the first window in the first interface comprises a first control, and the first touch operation is a touch operation performed on the first control.

10. The method according to claim 9, wherein the first window in the first interface further comprises a second control; and the method further comprises:
  detecting, by the mobile terminal, a touch operation performed on the second control; and
  displaying, by the mobile terminal, the target object in full screen mode in the first window in response to the touch operation performed on the second control.

11. The method according to claim 10, wherein a size of the third window is the same as a size of the display.

12. A mobile terminal, comprising:
  one or more processors;
  a memory; and
  a touchscreen, configured to detect a touch operation and display an interface, wherein the memory stores code, and when the code is executed by the one or more processors, the mobile terminal is configured to perform the following steps:
  displaying a first interface in a portrait orientation, wherein the first interface comprises a first window and a second window, the first window and the second window are used to display different user interfaces of an application, the first window and the second window have the same size and do not overlap, and the first window comprises a target object, wherein the target object is a video, and the video is played in a video play area of the first window;
  detecting a first touch operation in the video play are, wherein the first touch operation is used to indicate to display the video in full screen mode;
  displaying a second interface in a landscape orientation in response to the first touch operation, wherein the second interface comprises a third window, the third window displays the video in full screen mode, and the third window is larger than the first window; and
  detecting, by the mobile terminal, an instruction for exiting full-screen display:
  displaying, by the mobile terminal, a third interface, wherein the third interface comprises the first window and the second window, and sizes of the first window and the second window in the third interface are the same as sizes of the first window and the second window in the first interface.

13. The mobile terminal according to claim 12, wherein when the code is executed by the one or more processors, the mobile terminal is further configured to perform the following steps:
  obtaining a display orientation before the displaying in the landscape orientation, wherein the display orientation comprises the landscape orientation or the portrait orientation; and
  if the obtained display orientation is the portrait orientation, and a difference between a width and a height of the touchscreen is greater than a preset value, switch the display orientation from the portrait orientation to the landscape orientation.

14. The mobile terminal according to claim 13, wherein when the code is executed by the one or more processors, the mobile terminal is further configured to perform the following step:
  after obtaining the display orientation, if the obtained display orientation is the landscape orientation, displaying the second interface; and
  if the obtained display orientation is the portrait orientation, and the difference between the width and the height of the display is less than or equal to the preset value, displaying the second interface.

15. The mobile terminal according to claim 14, wherein when the code is executed by the one or more processors, the mobile terminal is further configured to perform the following steps:
  storing orientation switching information after the displaying in the landscape orientation, wherein the orientation switching information indicates that the display orientation is switched from the portrait orientation to the landscape orientation;
  after displaying the second interface, detecting an instruction for exiting full-screen display;
  switching the display orientation back to the portrait orientation based on the orientation switching information; and
  displaying, the third interface.

16. The mobile terminal according to claim 15, wherein when the code is executed by the one or more processors, the mobile terminal is further configured to implement an activity manager and a window manager;
  the activity manager is configured to:
    update first status information of the first window, wherein the first status information comprises a window size of the first window, and an updated window size of the first window is greater than a size of the first window in the first interface;

update updated first status information to a configuration file of an application corresponding to the first window;

the window manager is configured to:
draw the third window based on the updated first status information in the configuration file; and
the touchscreen is configured to display the third window, wherein the third window is used to display the video in full screen mode.

17. The mobile terminal according to claim 16, wherein the first interface comprises the first window and the second window in split-screen mode;
the activity manager is configured to switch a split-screen mode to a full-screen mode; and
the window manager is configured to draw the third window based on the updated first status information in the configuration file and the full-screen mode.

18. The mobile terminal according to claim 15, wherein when the code is executed by the one or more processors, the mobile terminal is configured to implement an activity manager and a window manager, and is further configured to perform the following step:
after the first touch operation is detected, storing, by the activity manager, second status information of the first window and second status information of the second window, wherein the second status information comprises a window size and a window mode; and
the activity manager is configured to update the stored second status information of the first window to a configuration file of an application corresponding to the first window;
the window manager is configured to draw the first window in the third interface based on the second status information of the first window in the configuration file;
the touchscreen is configured to display the first window in the third interface, wherein a size of the first window in the third interface is the same as a size of the first window in the first interface;
the activity manager is configured to update the stored second status information of the second window to a configuration file of an application corresponding to the second window;
the window manager is configured to draw the second window in the third interface based on the second status information of the second window in the configuration file; and
the touchscreen is configured to display the second window in the third interface, wherein a size of the second window in the third interface is the same as a size of the second window in the first interface.

19. The method according to claim 12, when the code is executed by the one or more processors, the mobile terminal is further configured to perform the following step: before displaying the second interface, determining that one or more of the following are met: an audio and video decoder is in a working state; an application corresponding to the first window in which the video is located obtains an audio focus; or the first window comprises a subwindow of a SurfaceView type.

20. The mobile terminal according to claim 19, wherein the first window in the first interface comprises a first control, and the first touch operation is a touch operation performed on the first control.

21. The mobile terminal according to claim 20, wherein the first window in the first interface further comprises a second control; and when the code is executed by the one or more processors, the mobile terminal is further configured to perform the following steps:
detecting a touch operation performed on the second control; and
displaying the target object in full screen mode in the first window in response to the touch operation performed on the second control.

22. The mobile terminal according to claim 21, wherein a size of the third window is the same as a size of the touchscreen.

23. A non-transitory computer-readable storage medium, comprising computer instructions, wherein when the computer instructions are run on an electronic device, the electronic device is configured to perform the following steps:
displaying a first interface in a portrait orientation, wherein the first interface comprises a first window and a second window, the first window and the second window are used to display different user interfaces of an application, the first window and the second window have the same size and do not overlap, and the first window comprises a target object, wherein the target object is a video, and the video is played in a video play area of the first window;
detecting a first touch operation in the video play area, wherein the first touch operation is used to indicate to display the video in full screen mode;
displaying a second interface in a landscape orientation in response to the first touch operation, wherein the second interface comprises a third window, the third window displays the video in full screen mode, and the third window is larger than the first window; and
detecting, by the mobile terminal, an instruction for exiting full-screen display;
switching, by the mobile terminal, the display orientation back to the portrait orientation; and displaying, by the mobile terminal, a third interface in the portrait orientation, wherein the third interface comprises the first window and the second window, and sizes of the first window and the second window in the third interface are the same as sizes of the first window and the second window in the first interface.

* * * * *